United States Patent
Gao et al.

(10) Patent No.: US 8,724,504 B2
(45) Date of Patent: May 13, 2014

(54) POWER CONTROL METHOD AND DEVICE FOR PHYSICAL UPLINK CONTROL CHANNEL

(75) Inventors: Xuejuan Gao, Beijing (CN); Zukang Shen, Beijing (CN); Xueming Pan, Beijing (CN)

(73) Assignee: Datang Mobile Communications Equipment Co., Ltd. (CN)

( * ) Notice: Subject to any disclaimer, the term of this patent is extended or adjusted under 35 U.S.C. 154(b) by 0 days.

(21) Appl. No.: 13/988,803

(22) PCT Filed: Nov. 22, 2011

(86) PCT No.: PCT/CN2011/082605
§ 371 (c)(1),
(2), (4) Date: May 29, 2013

(87) PCT Pub. No.: WO2012/068983
PCT Pub. Date: May 31, 2012

(65) Prior Publication Data
US 2013/0272157 A1 Oct. 17, 2013

(30) Foreign Application Priority Data

Nov. 22, 2010 (CN) .......................... 2010 1 0554295

(51) Int. Cl.
*H04W 52/00* (2009.01)
(52) U.S. Cl.
USPC .......................................... 370/252; 370/236
(58) Field of Classification Search
USPC .................. 370/252, 236, 476, 469, 470, 311
See application file for complete search history.

(56) References Cited

U.S. PATENT DOCUMENTS

| | | | |
|---|---|---|---|
| 8,233,458 B2 * | 7/2012 | Ahn et al. | 370/335 |
| 8,379,581 B2 * | 2/2013 | Imamura | 370/329 |
| 2009/0180433 A1 * | 7/2009 | Ahn et al. | 370/329 |
| 2010/0097978 A1 | 4/2010 | Palanki et al. | |
| 2010/0142455 A1 * | 6/2010 | Imamura | 370/329 |
| 2010/0265862 A1 * | 10/2010 | Choi et al. | 370/311 |
| 2010/0331037 A1 * | 12/2010 | Jen | 455/522 |
| 2011/0085483 A1 * | 4/2011 | Yeon et al. | 370/311 |

FOREIGN PATENT DOCUMENTS

| | | |
|---|---|---|
| CN | 101594683 A | 12/2009 |
| CN | 101720122 A | 6/2010 |
| CN | 101729217 A | 6/2010 |

* cited by examiner

*Primary Examiner* — Brian D Nguyen
(74) *Attorney, Agent, or Firm* — DLA Piper LLP (US)

(57) ABSTRACT

This application discloses a power control method and device of a Physical Uplink Control Channel (PUCCH) in a long term evolution (LTE) advanced system, relates to the technical field of wireless communications and is intended to reasonably determine the signal transmit power of a user equipment (UE) on the PUCCH to thereby improve the power utilization ratio of the user equipment. In this application, upon determining to bundle generated positive acknowledge (ACK)/negative acknowledge (NACK) information, the UE bundles the ACK/NACK information in a predefined bundling scheme, determines the power offset value corresponding to the number of bits carried on the PUCCH according to the bundling scheme and further determines the transmit power of the PUCCH. With the invention, the transmit power of the UE can be determined more reasonably.

21 Claims, 4 Drawing Sheets

POWER CONTROL METHOD AND DEVICE FOR PHYSICAL UPLINK CONTROL CHANNEL

This application is a US National Stage of International Application No. PCT/CN2011/082605, filed on 22 Nov. 2011, designating the United States, and claiming the benefit of Chinese Patent Application No. 201010554295.9, filed with the Chinese Patent Office on Nov. 22, 2010 and entitled "Power Control Method and Apparatus of Physical Uplink Control Channel", which is hereby incorporated by reference in its entirety.

FIELD OF THE INVENTION

The present invention relates to the field of wireless communications and particularly to a power control method and apparatus of a Physical Uplink Control Channel (PUCCH).

BACKGROUND OF THE INVENTION

For a Long Term Evolution Advanced (LTE-A) system to support a larger system bandwidth (e.g., 100 MHz) than a Long Term Evolution (LTE) system, there are generally the following two approaches: one way is direct allocation of a frequency spectrum with a bandwidth of 100 MHz as illustrated in FIG. 1, and the other way is aggregation of some frequency spectrum allocated to the existing system into a larger bandwidth for use by a long term evolution multi-carrier system, which is referred to as Carrier Aggregation (CA), where uplink and downlink carriers in the system may be configured asymmetrically, that is, a number of N≥1 carriers may be occupied by a user for downlink transmission while a number of N'≥1 carriers may be occupied for uplink transmission as illustrated in FIG. 2.

As currently defined in the LTE-A system, aggregation of at most 5 carriers can be supported, and a User Equipment (UE) needs to feed back the positive acknowledgement/negative acknowledgment (ACK/NACK) information corresponding to multiple downlink carriers and downlink sub-frames in one uplink sub-frame. As currently defined in the LTE-A system, for a Frequency Division Duplex (FDD) system, the number of ACK/NACK information bits to be fed back by a UE in one uplink sub-frame is determined by the number of downlink carriers configured for the UE and the transmission mode configured for each downlink carrier, that is, the UE needs to feed back ACK/NACK information of N+N$_0$ bits in one uplink sub-frame, where N is the number of downlink carriers configured for the UE, and N$_0$ is the number of downlink carriers with a multi-codeword transmission mode among the N downlink carriers; and for a Time Division Duplex (TDD) system, the number of ACK/NACK information bits to be fed back by a UE in one uplink sub-frame is determined by the number of downlink carriers configured for the UE, the transmission mode configured for each downlink carrier and the number of downlink sub-frames for which the UE needs to feed back ACK/NACK information in the same uplink sub-frame, that is, the UE needs to feed back ACK/NACK information of M×(N+N$_0$) bits in one uplink sub-frame, where N is the number of downlink carriers configured for the UE, N$_0$ is the number of downlink carriers with a multi-codeword transmission mode among the N downlink carriers, and M is the number of downlink sub-frames for which the UE needs to feed back ACK/NACK information in the same uplink sub-frame, and the value of M varies with different uplink and downlink configurations and uplink sub-frames, i.e., M is the number of indexes k in a set of indexes of downlink sub-frames K, $\{k_0, k_1, \ldots, k_{M-1}\}$, corresponding to each uplink sub-frame per uplink and downlink configuration in Table 1.

TABLE 1

| Uplink and downlink configuration | K: $\{k_0, k_1, \ldots, k_{M-1}\}$ Sub-frame No. | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As defined in the LTE-A system, the Physical Uplink Control Channel (PUCCH) format 1b with channel selection and the Physical Uplink Control Channel (PUCCH) format 3 are adopted as multiplexing transmission schemes of ACK/NACK information, where at most 4 bits are transmitted in the transmission scheme of the PUCCH format 1b with channel selection, and at most 20 bits are transmitted in the transmission scheme of the PUCCH format 3. When the UE needs to feed back ACK/NACK information above the foregoing thresholds, the ACK/NACK information has to be bundled so that the number of the ACK/NACK information bits to be fed back does not exceed the foregoing thresholds, and this bundling process can be performed through spatial bundling, time-domain bundling, frequency-domain bundling, etc.

In a Long Term Evolution Release 8/9 (LTE Rel-8/9) system, power control of a PUCCH is performed at the UE side, where the UE calculates the transmit power of the PUCCH based on the PUCCH power control related parameters configured by a base station for the UE and the current scheduling, and for details thereof, reference can be made to 3GPP TS36.213 particularly as follows:

In an uplink sub-frame i, the UE calculates the transmit power $P_{PUCCH}$ of a PUCCH using the following formula 1:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}[dBm] \quad \text{Formula 1}$$

Where:

$P_{CMAX}$ is higher layer-configured maximum UE transmit power;

$\Delta_{F\_PUCCH}(F)$ is higher layer-configured as a power offset value of a different PUCCH format from the PUCCH format 1a, where the PUCCH format in the LTE Rel-8/9 system includes numerous formats which are the PUCCH format 1/1a/1b/2/2a/2b;

$h(n_{CQI}, n_{HARQ})$ is a power offset value corresponding to the number of bits carried on the PUCCH, where $n_{CQI}$ corresponds to the number of bits of transmitted Channel State Information (CSI) including Channel Quality Indicator (CQI) information, Pre-coding Matrix Indicator (PMI) information, Rank Indication (RI) information and a Precoder Type Indication (PTI) information, and $n_{HARQ}$ corresponds to the number of bits of the transmitted ACK/NACK information;

$P_{0\_PUCCH}$ is a target value of PUCCH transmit power which is the sum of two higher layer-configured components, i.e., a cell specific component $P_{0\_NOMINAL\_PUCCH}$ and a UE specific component $P_{0\_UE\_PUCCH}$;

g(i) is an accumulative amount of the power control commands; and

PL is the value of the path loss measured by the UE.

In the LTE Rel-8/9 system, $h(n_{CQI}, n_{HARQ})$ is defined differently for the different PUCCH formats:

$h(n_{CQI}, n_{HARQ})=0$ is defined for the PUCCH formats 1/1a/1b;

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases}$$

is defined in a normal Cyclic Prefix (CP) for the PUCCH formats 2/2a/2b; and $$h(n_{CQI}, n_{HARQ}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

is defined in an extended CP for the PUCCH format 2.

The power control solution of the LTE Rel-8/9 system can be reused as much as possible for the PUCCH power control in the LTE-A system except for the additional transmission schemes in the LTE-A system of the PUCCH format 3, and the PUCCH format 1b with channel selection which is applicable in a scenario with aggregation of multiple carriers, as compared with the LTE Rel-8/9 system, where for the PUCCH format 3, $h(n_{CQI}, n_{HARQ}, n_{SR})$ is defined as $h(n_{CQI}, n_{HARQ}, n_{SR}) = (n_{HARQ} + n_{SR} - 1)/3$ when the UE is configured with 2 antenna ports for transmission or the UE transmits ACK/NACK and/or SR information of more than 11 bits, and as $h(n_{CQI}, n_{HARQ}, n_{SR}) = (n_{HARQ} + n_{SR} - 1)/2$ otherwise; and for the PUCCH format 1b with channel selection applicable in a scenario with aggregation of multiple carriers, $h(n_{CQI}, n_{HARQ}, n_{SR})$ is defined as $h(n_{CQI}, n_{HARQ}, n_{SR}) = (n_{HARQ} - 1)/2$. For transmission of ACK/NACK information on a PUCCH, a power offset value corresponding to the number of bits carried on the PUCCH is calculated largely based on $n_{HARQ}$. As currently defined, $n_{HARQ}$ is determined by the number of Transport Blocks (TBs) actually received by the UE and the number of PDCCH indicating a downlink Semi-Persistent Scheduling (SPS) release actually received by the UE, so as to ensure that the PUCCH transmit power of the UE corresponds to the number of actually scheduled downlink carriers and downlink sub-frames as much as possible to avoid a power waste.

However the foregoing solution suffers from the following technical problems:

When the number of original ACK/NACK information bits to be fed back in an uplink sub-frame determined by the UE based on the configuration exceeds the largest capacity of the PUCCH format 1b with channel selection or the PUCCH format 3, the UE has to bundle the original ACK/NACK information, and at this time it is very likely for the number of the bundled ACK/NACK information bits actually transmitted by the UE is much more possible to be smaller than the number of transport blocks actually received by the UE, and if the UE still calculates the PUCCH transmit power based on the number of actually received transport blocks at this time, the PUCCH transmit power of the UE will be larger than that required for actual transmission, thus resulting in a power waste.

SUMMARY OF THE INVENTION

Embodiments of the invention provide a power control method and apparatus of a Physical Uplink Control Channel (PUCCH) in a Long Term Evolution Advanced system so as to improve the power utilization ratio of a user equipment.

A power control method of a Physical Uplink Control Channel (PUCCH) in a Long Term Evolution Advanced system includes:

receiving, by a User Equipment, UE, downlink data and generating positive acknowledgement, ACK,/negative acknowledgment, NACK, information;

determining, by the UE, whether to bundle the generated ACK/NACK information;

determining, by the UE, the parameter value of the number of ACK/NACK bits, $n_{HARQ}$, according to the bundling scheme used for the ACK/NACK information upon determining to bundle the generated ACK/NACK information; and determining, by the UE, the power offset value corresponding to the number of bits carried on the PUCCH using the parameter value of the number of ACK/NACK bits, $n_{HARQ}$, and then determining the transmit power of the PUCCH based on the power offset value and transmitting the bundled ACK/NACK information on the PUCCH with the transmit power.

A User Equipment, UE, includes:

a feedback information generating unit configured to receive downlink data and to generate positive acknowledgement, ACK,/negative acknowledgment, NACK, information;

a bundling determining unit configured to determine whether to bundle the generated ACK/NACK information;

a parameter determining unit configured to determine the parameter value of the number of ACK/NACK bits, $n_{HARQ}$, according to the bundling scheme used for the ACK/NACK information upon determining to bundle the generated ACK/NACK information; and a data transmitting unit configured to determine the power offset value corresponding to the number of bits carried on a PUCCH using the parameter value of the number of ACK/NACK bits, $n_{HARQ}$, and then to determine the transmit power of the PUCCH based on the power offset value and to transmit the bundled ACK/NACK information on the PUCCH with the transmit power.

In the invention, a User Equipment (UE) receives data in M downlink sub-frames of N configured downlink carriers and generates acknowledgement (ACK)/negative acknowledgement (NACK) information dependent according to the reception results; determines whether to bundle the generated ACK/NACK information, and bundles the ACK/NACK information using a predefined bundling scheme and determines the parameter value of the number of ACK/NACK bits, $n_{HARQ}$, according to the bundling scheme when it is determined to bundle the generated ACK/NACK information; and then determines a power offset value corresponding to the number of bits carried on the PUCCH using the parameter value of the number of ACK/NACK bits, $n_{HARQ}$, determines the transmit power of the PUCCH based on the power offset value and transmits the bundled ACK/NACK information on the PUCCH with the transmit power. As can be apparent, since the number of bits of the bundled ACK/NACK information is far smaller than the number of actually received transport blocks in most cases, upon determining the parameter value of the number of ACK/NACK bits, $n_{HARQ}$, according to the bundling scheme of the ACK/NACK information, it can be ensured that the actual transmit power of the UE matches with the number of bits of the actually transmitted information as much as possible, thereby determining the PUCCH transmit power of the UE more reasonably, avoiding a power waste and improving the power utilization ratio of the UE.

DETAILED DESCRIPTION OF THE EMBODIMENTS

In order to save signal transmit power of a UE on a PUCCH and improve the power utilization ratio of the UE, an embodiment of the invention provides a power control method of a Physical Uplink Control Channel (PUCCH) in a long term evolution advanced system, and in this method, when a UE needs to bundle the generated ACK/NACK information, the UE shall determines a parameter value of the number of ACK/NACK bits, $n_{HARQ}$, which is used to calculate a power offset value corresponding to the number of bits carried on the PUCCH according to the bundling scheme, and then determines the power offset value corresponding to the number of bits carried on the PUCCH based on the $n_{HARQ}$, determines the transmit power of the PUCCH based on the power offset value and transmits the bundled ACK/NACK information on the PUCCH with the transmit power.

Figure 1:
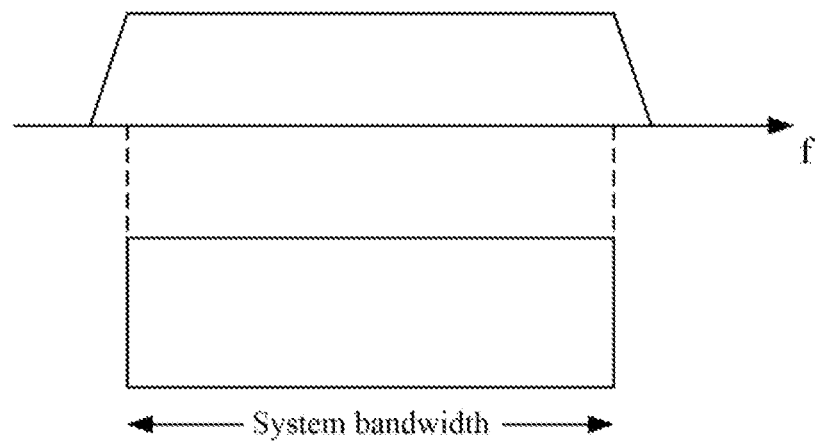
FIG. 1 is a schematic diagram of a system with a single spectrum in the prior art.
Figure 2:
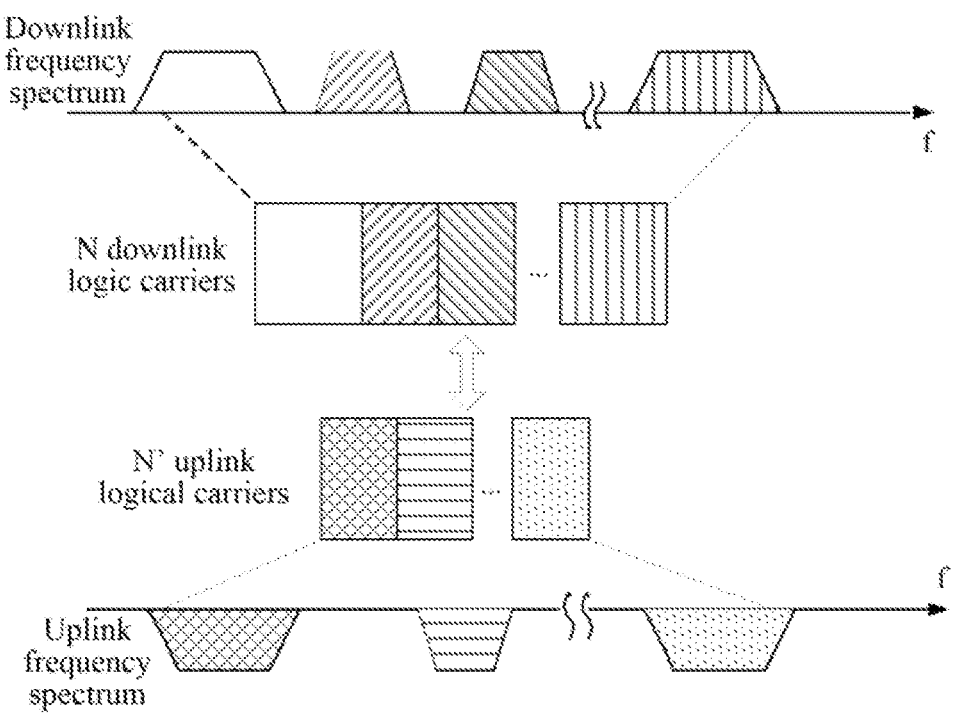
FIG. 2 is a schematic diagram of a system with aggregation of frequency bands in the prior art.
Figure 3:
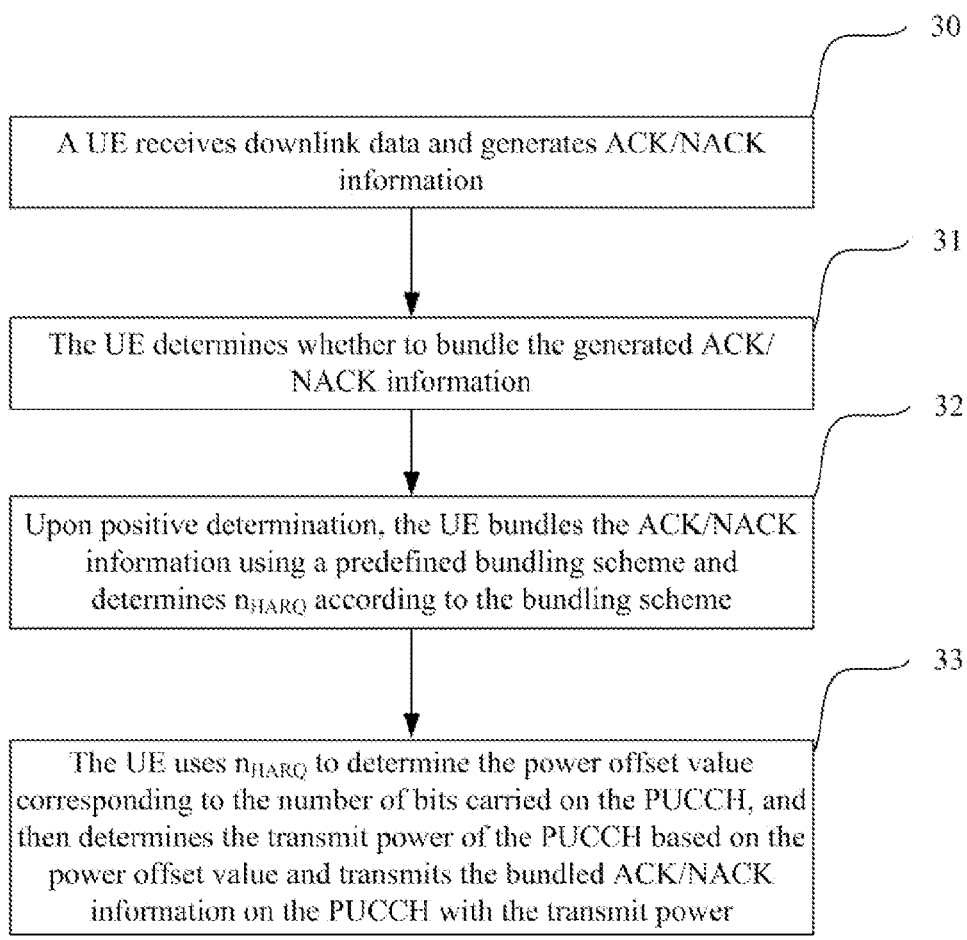
FIG. 3 is a schematic flow chart of a method according to an embodiment of the invention.

Referring to FIG. 3, a power control method of a Physical Uplink Control Channel (PUCCH) in a long term evolution advanced system according to an embodiment of the invention particularly includes the following steps:

Step 30: A UE receives downlink data and generates ACK/NACK information;

Step 31: The UE determines whether to bundle the generated ACK/NACK information;

Step 32: Upon determining to bundle the generated ACK/NACK information, the UE bundles the ACK/NACK information using a predefined bundling scheme and determines the parameter value of the number of ACK/NACK bits, $n_{HARQ}$, according to the bundling scheme, where the $n_{HARQ}$ is used to calculate the power offset value corresponding to the number of bits carried on the PUCCH;

Step 33: The UE determines the power offset value corresponding to the number of bits carried on the PUCCH using $n_{HARQ}$ determined in the step 32, determines the transmit power of the PUCCH based on the power offset value, which can be determined particularly with the formula 1 in the Background of invention, and transmits the bundled ACK/NACK information on the PUCCH with the transmit power.

In the step 31, for an FDD system, the number of ACK/NACK information bits to be fed back by the UE in one uplink sub-frame is $N+N_0$, where N is the number of downlink carriers configured for the UE, and $N_0$ is the number of downlink carriers with a multi-codeword transmission mode among the N downlink carriers configured for the UE; and for a TDD system, the number of ACK/NACK information bits to be fed back by the UE in one uplink sub-frame is $M \times (N+N_0)$, where N is the number of downlink carriers configured for the UE, $N_0$ is the number of downlink carriers with a multi-codeword transmission mode among the N downlink carriers configured for the UE, and M is the number of downlink sub-frames for which the UE needs to feed back ACK/NACK information in the same uplink sub-frame, and the value of M varies with different uplink and downlink configurations and uplink sub-frames, see Table 1; or when a different downlink carrier corresponds a different value of M in the same uplink sub-frame, the number of ACK/NACK information bits to be fed back by the UE in one uplink sub-frame is $$\sum_{i=1}^{N} M_i,$$

where $M_i$ is the number of downlink sub-frames on the i-th downlink carrier for which the UE needs to feed back ACK/NACK information in the current uplink sub-frame.

If the number of ACK/NACK information bits to be fed back by the UE exceeds the largest transmission capacity (e.g., 20 bits) corresponding to the current PUCCH format, then the ACK/NACK information will be bundled so that the number of feedback bits after bundling does not exceed the largest transmission capacity; otherwise, the ACK/NACK information will not be bundled.

In the step 32, the bundling scheme is one or any combination of a spatial bundling scheme, a time-domain bundling scheme, a frequency-domain bundling scheme and a bundling scheme with an indicator of the number of data packets/transport blocks correctly received by the UE.

In the step 32, the parameter value of the number of ACK/NACK bits, $n_{HARQ}$, which is used to calculate the power offset value, can be determined according to the bundling scheme used for the ACK/NACK information particularly in the following three solutions:

In a first solution, the UE determines the parameter value of the number of ACK/NACK bits, $n_{HARQ}$, according to the number of bits of the bundled ACK/NACK information;

In a second solution, the UE determines the parameter value of the number of ACK/NACK bits, $n_{HARQ}$, according to the bundling scheme used for the ACK/NACK information, and the downlink carriers on which the downlink data is received by the UE and/or the downlink sub-frames in which the downlink data is received by the UE;

In a third solution, the UE determines the parameter value of the number of ACK/NACK bits, $n_{HARQ}$, according to the bundling scheme used for the ACK/NACK information, and the downlink carriers on which UE receives downlink data and/or the downlink sub-frames in which UE receives downlink data, and the downlink carriers on which UE does not receive downlink data but detects at least one downlink data has been missed and/or the downlink sub-frames in which UE does not receive downlink data but detects at least one downlink data has been missed.

The downlink data in the foregoing second and third solutions includes data transmitted on a Physical Downlink Shared Channel (PDSCH) and data transmitted on a Physical Downlink Control Channel (PDCCH) indicating downlink SPS release.

With the Use of the First Solution:

If the UE adopts the spatial bundling scheme, the UE determines the number of bits of the bundled ACK/NACK information as N×M, where N is the number of downlink carriers configured for the UE, and M is the number of downlink sub-frames for which the UE needs to feed back ACK/NACK information in the current uplink sub-frame, and then the UE determines the parameter value of the number of ACK/NACK bits, $n_{HARQ}$, as N×M; or If the UE adopts the spatial bundling scheme, the UE determines the number of bits of the bundled ACK/NACK information as $$\sum_{i=1}^{N} M_i,$$

where N is the number of downlink carriers configured for the UE, and $M_i$ is the number of downlink sub-frames on the i-th downlink carrier for which the UE needs to feed back ACK/NACK information in the current uplink sub-frame, and then the UE determines the parameter value of the number of ACK/NACK bits, $n_{HARQ}$, as $$\sum_{i=1}^{N} M_i;$$

or

If the UE adopts the spatial bundling+frequency-domain bundling scheme, the UE determines the number of bits of the bundled ACK/NACK information as M, where M is the number of downlink sub-frames for which the UE needs to feed back ACK/NACK information in the current uplink sub-frame, and then the UE determines the parameter value of the number of ACK/NACK bits, $n_{HARQ}$, as M; or If the UE adopts the spatial bundling+time-domain bundling scheme, the UE determines the number of bits of the bundled ACK/NACK information as L, where L is the number of information bits obtained by the UE performing spatial bundling and time-domain bundling on ACK/NACK information of M downlink sub-frames on N downlink carriers, N is the number of downlink carriers configured for the UE, and M is the number of downlink sub-frames for which the UE needs to feed back ACK/NACK information in the current uplink sub-frame, and then the UE determines the parameter value of the number of ACK/NACK bits, $n_{HARQ}$, as L; or If the UE adopts the spatial bundling scheme+the bundling scheme with an indicator of the number of data packets correctly received by the UE, the UE determines the number of bits of the bundled ACK/NACK information as K, where K is the number of information bits for indicating the number of data packets correctly received by the UE (that is, the total number of correctly received PDSCHs and the PDCCHs indicating downlink SPS release), and then the UE determines the parameter value of the number of ACK/NACK bits, $n_{HARQ}$, as K.

In the foregoing case, M=1 for an FDD system; and M is an integer no less than 1 and no more than 4 for a TDD system.

With the Use of the Second Solution:

If the UE adopts the spatial bundling scheme, based on the downlink carriers on which downlink data is received by the UE and/or the downlink sub-frames in which downlink data is received by the UE, the UE determines the total number of transport blocks received by the UE and the PDCCHs indicating downlink SPS release received by the UE as S, and determines the number of received PDSCHs with a multi-codeword transmission mode and with multiple codewords being scheduled concurrently as $S_1$, and then the UE determines the parameter value of the number of ACK/NACK bits, $n_{HARQ}$, as $S-S_1$; or If the UE adopts the spatial bundling+frequency-domain bundling scheme, based on the downlink carriers on which downlink data is received by the UE and/or the downlink sub-frames in which downlink data is received by the UE, the UE determines the number of downlink sub-frames in which the UE receives at least a transport block and/or a PDCCH indicating downlink SPS release among M downlink sub-frames as $M_1$, where M is the number of downlink sub-frames for which the UE needs to feed back ACK/NACK information in the current uplink sub-frame, and then the UE determines the parameter value of the number of ACK/NACK bits, $n_{HARQ}$, as $M_1$; or If the UE adopts the spatial bundling+time-domain bundling scheme, based on the downlink carriers on which downlink data is received by the UE and/or the downlink sub-frames in which downlink data is received by the UE, the UE determines the number of information bits obtained by the UE performing spatial bundling and time-domain bundling on ACK/NACK information of M downlink sub-frames on $N_1$ downlink carriers as $L_1$, where the $N_1$ downlink carriers are downlink carriers on which the UE receives a transport block and/or a PDCCH indicating downlink SPS release, and M is the number of downlink sub-frames for which the UE needs to feed back ACK/NACK information in the current uplink sub-frame, and then the UE determines the parameter value of the number of ACK/NACK bits, $n_{HARQ}$, as $L_1$; or If the UE adopts the spatial bundling scheme+the bundling scheme with an indicator of the number of data packets correctly received by the UE, based on the downlink carriers on which downlink data is received by the UE and/or the downlink sub-frames in which downlink data is received by the UE, the UE determines the number of information bits for indicating the number of data packets correctly received by the UE as K, and then the UE determines the parameter value of the number of ACK/NACK bits, $n_{HARQ}$, as K.

With the Use of the Third Solution:

If the UE adopts the spatial bundling scheme, based on the downlink carriers on which downlink data is received by the UE and/or the downlink sub-frames in which downlink data is received by the UE, the UE determines the total number of transport blocks received by the UE and the PDCCHs indicating downlink SPS release received by the UE as S, and determines the number of received PDSCHs with a multi-codeword transmission mode and with multiple codewords being scheduled concurrently as $S_1$, and based on the downlink carriers on which UE does not receive downlink data but detects at least one data has been missed and/or the downlink sub-frames in which UE does not receive downlink data but detects at least one data has been missed, the UE determines the total number of missed PDSCHs detected by the UE and the missed PDCCHs indicating downlink SPS release detected by the UE, as P, and then the UE determines the parameter value of the number of ACK/NACK bits, $n_{HARQ}$, as $S-S_1+P$; or If the UE adopts the spatial bundling+frequency-domain bundling scheme, based on the downlink carriers on which downlink data is received by the UE and/or the downlink sub-frames in which downlink data is received by the UE, the UE determines the number of downlink sub-frames in which the UE receives at least a transport block and/or a PDCCH indicating downlink SPS release among M downlink sub-frames as $M_1$, and based on the downlink carriers on which UE does not receive downlink data but detects at least one data has been missed and/or the downlink sub-frames in which UE does not receive downlink data but detects at least one data has been missed, the UE determines the number of downlink sub-frames in which the UE does not receive data but detects at least one data has been missed among the M downlink sub-frames as $P_1$, where M is the number of downlink sub-frames for which the UE needs to feed back ACK/NACK information in the current uplink sub-frame, and then the UE determines the parameter value of the number of ACK/NACK bits, $n_{HARQ}$, as $M_1+P_1$; or If the UE adopts the spatial bundling+time-domain bundling scheme, based on the downlink carriers on which downlink data is received by the UE and/or the downlink sub-frames in which downlink data is received by the UE, and based on the downlink carriers on which UE does not receive downlink data but detects at least one data has been missed and/or the downlink sub-frames in which UE does not receive downlink data but detects at least one data has been missed, the UE determines the number of information bits obtained by the UE performing spatial bundling and time-domain bundling on ACK/NACK information of M downlink sub-frames on $N_2$ downlink carriers as $L_2$, where the $N_2$ downlink carriers include the downlink carriers on which the UE receives at least a transport block and/or a PDCCH indicating downlink SPS release and the downlink carriers on which the UE does not receive data but detects at least one data has been missed, where M is the number of downlink sub-frames for which the UE needs to feed back ACK/NACK information in the current uplink sub-frame, and then the UE determines the parameter value of the number of ACK/NACK bits, $n_{HARQ}$, as $L_2$; or If the UE adopts the spatial bundling scheme+the bundling scheme with an indicator of the number of data packets correctly received by the UE, based on the downlink carriers on which downlink data is received by the UE and/or the downlink sub-frames in which downlink data is received by the UE, and based on the downlink carriers on which UE does not receive downlink data but detects at least one data has been missed and/or the downlink sub-frames in which UE does not receive downlink data but detects at least one data has been missed, the UE determines the number of information bits for indicating the number of data packets correctly received by the UE, as K, and then the UE determines the parameter value of the number of ACK/NACK bits, $n_{HARQ}$, as K.

In the step 31, when the UE determines not to bundle the generated ACK/NACK information, the UE can determine the parameter value of the number of ACK/NACK bits, $n_{HARQ}$, according to the number of the following data: the transport blocks received by the UE and the PDCCHs indicating downlink SPS release received by the UE. For example, the UE determines the parameter value of the number of ACK/NACK bits, $n_{HARQ}$, as S, where S is the total number of transport blocks received by the UE and the PDCCHs indicating downlink SPS release received by the UE. Then the UE determines the power offset value corresponding to the number of bits carried on the PUCCH using the parameter value of the number of ACK/NACK bits, $n_{HARQ}$, determines the transmit power of the PUCCH based on the power offset value and transmits the ACK/NACK information generated in the step 30 on the PUCCH with the transmit power; or The UE can determine the parameter value of the number of ACK/NACK bits, $n_{HARQ}$, according to the number of the following data: the transport blocks received by the UE and the PDCCHs indicating downlink SPS release received by the UE, and the missed transport blocks/PDSCHs detected by the UE, and the missed PDCCHs indicating downlink SPS release detected by the UE. For example, the UE determines the parameter value of the number of ACK/NACK bits, $n_{HARQ}$, as S+P, where S is the total number of transport blocks received by the UE and the PDCCHs indicating downlink SPS release received by the UE, and P is the total number of missed transport blocks/PDSCHs detected by the UE and the missed PDCCHs indicating downlink SPS release detected by the UE. Then the UE determines the power offset value corresponding to the number of bits carried on the PUCCH using the parameter value of the number of ACK/NACK bits, $n_{HARQ}$, and then determines the transmit power of the PUCCH based on the power offset value and transmits the ACK/NACK information generated in the step 30 on the PUCCH with the transmit power.

Preferably after the UE determines the parameter value of the number of ACK/NACK bits, $n_{HARQ}$ in the step 32 and before the UE determines the power offset value corresponding to the number of bits carried on the PUCCH in the step 33, if an uplink sub-frame in which the UE transmits the ACK/NACK information is an SR sub-frame and SR information and the ACK/NACK information is jointly encoded for transmission, then 1 is added to the parameter value of the number of ACK/NACK bits, $n_{HARQ}$, which is used to calculate the power offset value, and in the step 33, the UE uses $n_{HARQ}$ with 1 added thereto, to determine the power offset value corresponding to the number of bits carried on the PUCCH, and then determines the transmit power of the PUCCH based on the power offset value and transmits the bundled ACK/NACK information on the PUCCH with the transmit power; or a parameter value of the number of SR bits, $n_{SR}$, is introduced directly to the formula in which the power offset value corresponding to the number of bits carried on the PUCCH is determined, and if an uplink sub-frame in which the UE transmits the ACK/NACK information is an SR sub-frame and SR information and the ACK/NACK information is jointly encoded for transmission, then $n_{SR}=1$; otherwise, $n_{SR}=0$.

In the step 33, the UE determines the power offset value corresponding to the number of bits carried on the PUCCH using $n_{HARQ}$ determined in the step 32 and determines the transmit power of the PUCCH based on the power offset value, particularly using the following formula of:

$$P_{PUCCH}(i) = \min(P_{CMAX,c}(i), P_{0\_PUCCH} + PL_c + h(n_{CQI}, n_{HARQ}, n_{SR}) + \Delta_{F\_PUCCH}(F) + \Delta_{TxD}(F') + g(i));$$

Where $P_{CMAX,c}(i)$ is higher layer-configured maximum transmit power of the UE;

$\Delta_{F\_PUCCH}(F)$ is a higher layer-configured power offset value of a different PUCCH format from the PUCCH format 1a;

$h(n_{CQI}, n_{HARQ}, n_{SR})$ is a power offset value corresponding to the number of bits carried on the PUCCH, where $n_{CQI}$ is a parameter value of the number of bits of Channel State Information (CSI), $n_{HARQ}$ is the parameter value of the number of ACK/NACK bits, and $n_{SR}$ is a parameter value of the number of bits of a Scheduling Request (SR);

$P_{0\_PUCCH}$ is a target value of the transmit power of the PUCCH;

g(i) is an accumulative amount of the power control commands;

$PL_c$ is the value of the path loss measured by the UE; and $\Delta_{T \times D}(F')$ is a higher layer-configured value of transmit power adjustment for the transmit diversity scheme of the UE.

It shall be noted that the foregoing steps are applicable to scenarios where the ACK/NACK information is transmitted separately, the ACK/NACK information and the SR information are transmitted concurrently, the ACK/NACK information and a periodical CSI are transmitted concurrently, etc., on the PUCCH, where the periodical CSI includes a CQI, a PMI, an RI, a PTI, etc.

The invention will be detailed below.

In an LTE-A system, when a UE is configured with N (N≥1) downlink carriers and the UE transmits ACK/NACK on a PUCCH, power control of a Physical Uplink Control Channel (PUCCH) can be performed in the following method:

Step 1: The UE receives data in M downlink sub-frames of a part or all of the configured N downlink carriers and generates ACK/NACK information, where N≥1 and M≥1, and the ACK/NACK information corresponding to the data in the M downlink sub-frames is transmitted in the same uplink sub-frames;

Step 2: The UE determines whether to bundle the ACK/NACK feedback information; and Step 3_1: If the UE determines to bundle the ACK/NACK information, then the UE determines the parameter value of the number of ACK/NACK bits, $n_{HARQ}$, according to the ACK/NACK bundling scheme and further uses $n_{HARQ}$ to determine the power offset value corresponding to the number of bits carried on the PUCCH;

The downlink data includes a dynamic PDSCH, a SPS PDSCH and a PDCCH indicating downlink SPS release; and the PDSCH can be configured with a single-codeword transmission mode or a multi-codeword transmission mode, and the PDSCH with the multi-codeword transmission mode can include one transport block/codeword or 2 transport blocks/codewords;

The ACK/NACK bundling scheme can be one or any combination of a spatial bundling scheme, a time-domain bundling scheme, a frequency-domain bundling scheme and a bundling scheme with K-bit information for indicating the number of data packets correctly received by the UE;

The UE can determine $n_{HARQ}$ in the following three methods:

In a first method, the UE determines $n_{HARQ}$ according to the number of the bundled ACK/NACK information bits, particularly:

With the spatial bundling scheme, $n_{HARQ}=N \times M$, where M=1 for an FDD system, and 1≤M≤4 for a TDD system, and M is determined particularly according to the uplink and downlink configuration of the TDD system; or With the spatial bundling scheme, $$n_{HARQ} = \sum_{i=1}^{N} M_i,$$

where $M_i$ is the number of downlink sub-frames on the i-th downlink carrier for which the UE will feed back ACK/NACK information in the current uplink sub-frame, and $M_i=1$ for an FDD system, and 1≤$M_i$≤4 for a TDD system, and $M_i$ is determined particularly according to the uplink and downlink configuration of the TDD system;

With the spatial bundling+frequency-domain bundling scheme, $n_{HARQ}=M$;

With the spatial bundling+time-domain bundling scheme, $n_{HARQ}=L$, where L is the number of information bits obtained by the UE performing spatial bundling and time-domain bundling on ACK/NACK information of M downlink sub-frames respectively on each downlink carrier, and preferably L=3 or 4; and With the spatial bundling scheme+the bundling scheme with K-bit information for indicating the number of data packets correctly received by the UE (including a dynamic PDSCH, a SPS PDSCH and a PDCCH indicating downlink SPS release), $n_{HARQ}=K$, where K=2, 3 or 4, and preferably K is configured with the latter two values;

In a second method, the UE determines $n_{HARQ}$ according to the bundling scheme used for the ACK/NACK information based on the downlink carriers on which the UE actually receives downlink data and/or the downlink sub-frames in which the UE actually receives downlink data, particularly:

With the spatial bundling scheme, $n_{HARQ}=S-S_1$, where $S_1<S$, and S is the total number of transport blocks received by the UE and the PDCCHs indicating downlink SPS release received by the UE, and $S_1$ is the number of received PDSCHs with a multi-codeword transmission mode and with two codewords being scheduled concurrently;

With the spatial bundling+frequency-domain bundling scheme, $n_{HARQ}=M_1$, where $M_1 \leq M$, and $M_1$ is the number of downlink sub-frames in which the UE receives at least a transport block and/or a PDCCH indicating downlink SPS release, among M downlink sub-frames;

With the spatial bundling+time-domain bundling scheme, $n_{HARQ}=L_1$, where $L_1 \leq L$, and $L_1$ is the number of information bits obtained by the UE performing spatial bundling and time-domain bundling on ACK/NACK information of M downlink sub-frames on $N_1$ downlink carriers, and the $N_1$ downlink carriers are the downlink carriers on which the UE receives at least a transport block and/or a PDCCH indicating downlink SPS release; and preferably $L_1=3$ or 4; and With the spatial bundling scheme+the bundling scheme with K-bit information for indicating the number of data packets correctly received by the UE, $n_{HARQ}=K$, where K is the number of information bits for indicating the number of data packets correctly received by the UE in M downlink sub-frames of N downlink carriers (i.e., the total number of correctly received PDSCHs and PDCCHs indicating downlink SPS release); and K=2, 3 or 4, and preferably K is configured with the latter two values;

In a third solution, the UE determines $n_{HARQ}$ according to the bundling scheme used for the ACK/NACK information, and the number of downlink carriers on which downlink data is actually received by the UE and/or the downlink sub-frames in which downlink data is actually received by the UE, and the number of downlink carriers on which UE does not receive downlink data but detects at least one data has been missed and/or downlink sub-frames in which UE does not receive downlink data but detects at least one data has been missed, particularly:

With the spatial bundling scheme, $n_{HARQ}=S-S_1+P$, where $S_1<S$, and S is the sum of the number of transport blocks received by the UE and the number of PDCCHs indicating downlink SPS release received by the UE, $S_1$ is the number of PDSCHs, received by the UE, with a multi-codeword transmission mode and with two codewords being scheduled concurrently, and P is the sum of the number of PDSCHs determined by the UE to have a loss of packet and the number of PDCCHs indicating downlink SPS release determined to have a loss of packet;

With the spatial bundling+frequency-domain bundling scheme, $n_{HARQ}=M_1+P_1$, where $M_1 \leq M$, and $M_1$ is the number of downlink sub-frames in which the UE receives at least a transport block and/or a PDCCH indicating downlink SPS release among the M downlink sub-frames, and $P_1$ is the number of downlink sub-frames in which the UE does not receive data but detects at least one data has been missed among the M downlink sub-frames;

With the spatial bundling+time-domain bundling scheme, $n_{HARQ}=L_2$, where $L_2 \leq L$, and $L_2$ is the number of information bits obtained by the UE performing spatial bundling and time-domain bundling on ACK/NACK information of M downlink sub-frames on $N_2$ downlink carriers, and the $N_2$ downlink carriers include the downlink carriers on which the UE actually receives at least a transport block and/or a PDCCH indicating downlink SPS release and the downlink carriers on which the UE does not receive data but detects at least one data has been missed; and preferably $L_2=3$ or 4; and With the spatial bundling scheme+the bundling scheme with K-bit information for indicating the number of data packets correctly received by the UE, $n_{HARQ}=K$, where K is the number of information bits for indicating the number of data packets correctly received by the UE in M downlink sub-frames of N downlink carriers (i.e., the total number of correctly received PDSCHs and PDCCHs indicating downlink SPS release); and K=2, 3 or 4, and preferably K is configured with the latter two values; and Step 3_2: If the UE determines not to bundle the ACK/NACK information, then the UE determines $n_{HARQ}$ according to the actually received downlink data and further uses $n_{HARQ}$ to determine the power offset value corresponding to the number of bits carried on the PUCCH; where the downlink data includes a dynamic PDSCH, a SPS PDSCH and a PDCCH indicating downlink SPS release, and the PDSCH can be configured with a single-codeword transmission mode or a multi-codeword transmission mode, and the PDSCH with the multi-codeword transmission mode can be scheduled with 1 transport block (1 codeword) or 2 transport blocks (two codewords);

$n_{HARQ}$ can be determined particularly in the following methods:

In a method A, $n_{HARQ}=S$, where S is the sum of the number of transport blocks received by the UE and the number of PDCCHs indicating downlink SPS release received by the UE; and In a method B, $n_{HARQ}=S+P$, where S is the sum of the number of transport blocks received by the UE and the number of PDCCHs indicating downlink SPS release received by the UE, and P is the sum of the number of transport blocks (or PDSCHs) determined by the UE to have a loss of a packet and the number of PDCCHs indicating downlink SPS release determined to have a loss of a packet; and Step 4: The UE determines the transmit power of the PUCCH based on the power offset value corresponding to the number of bits carried on the PUCCH and transmits the ACK/NACK information on the PUCCH with the determined transmit power.

A specific PUCCH format can be the PUCCH format 1b used in the PUCCH format 1b with channel selection transmission scheme or the PUCCH format 3.

It shall be noted in the foregoing process that if an uplink sub-frame in which the UE feeds back the ACK/NACK information is an SR sub-frame (that is, determined from a transmission period of an SR as an uplink sub-frame in which an SR can be transmitted) and SR information and the ACK/NACK information is jointly encoded for transmission, then the number of SR bits, $n_{SR}$, shall be considered for inclusion in the parameter in the SR sub-frame, the number of bits from which the power offset value corresponding to the number of bits carried on the PUCCH is calculated, where the number of SR bits can be included in $n_{HARQ}$. That is, 1 is added to $n_{HARQ}$; or the parameter, $n_{SR}$, can be added directly to the formula, which is used to calculate the power offset value corresponding to the number of bits carried on the PUCCH, to indicate whether an SR is transmitted, where if an SR is transmitted, then $n_{SR}=1$; otherwise, $n_{SR}=0$.

First Embodiment

Figure 4A:
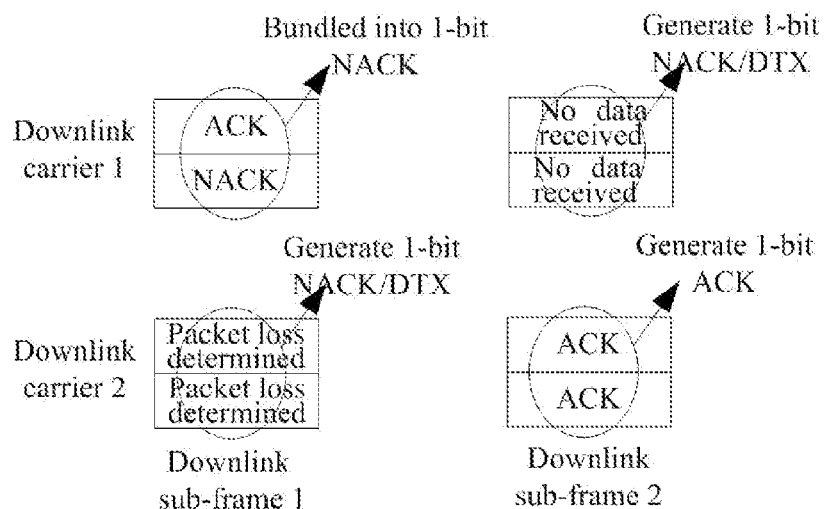
FIG. 4A is a schematic diagram of information bundling according to a first embodiment of the invention.

A UE is configured with two downlink carriers, where the downlink carrier 1 is the primary downlink carrier, and both the downlink carrier 1 and the downlink carrier 2 use the multi-codeword transmission mode, and M=2, that is, the UE needs to feed back ACK/NACK information of two downlink sub-frames in the current uplink sub-frame; and a base station schedules only the downlink sub-frame 1 on the downlink carrier 1 and schedules the downlink sub-frames 1 and 2 on the downlink carrier 2, but the packet in the downlink sub-frame 1 has been missed at the UE side, as illustrated in FIG. 4A; the PUCCH format 1b with channel selection or the PUCCH format 3 is adopted as the transmission scheme for the ACK/NACK information, and the ACK/NACK information will be spatially bundled, and a specific flow of PUCCH power control is as follows:

The UE needs to feed back 4-bit ACK/NACK information after spatial bundling according to the configuration of the UE; and the UE generates 1-bit NACK information for the downlink sub-frame 1 of the downlink carrier 1 and 1-bit ACK information for the downlink sub-frame 2 of the downlink carrier 2 based on the data have been received actually in those downlink sub-frames, the UE determines that one packet in the downlink sub-frame 1 of the downlink carrier 2 has been missed according to the DAI value in the DL grant and generates 1-bit NACK/DTX information as the feedback information of this downlink sub-frame, and the UE does not receive any data in the downlink sub-frame 2 of the downlink carrier 1 and generates 1-bit NACK/DTX information as the feedback information of this downlink sub-frame, so the UE actually transmits 4-bit ACK/NACK information in detail as [ACK,NACK/DTX,NACK,ACK]; and With the first power control method, the UE determines that 4-bit ACK/NACK information after spatial bundling shall be fed back according to the configuration of N=2 and M=2, and then the UE determines the parameter value of the number of ACK/NACK bits, $n_{HARQ}=N \times M=4$ regardless of how many transport packets have been received actually, and uses $n_{HARQ}=4$ to calculate the power offset value corresponding to the number of bits carried on the PUCCH and further determines the transmit power of the PUCCH and transmits the bundled ACK/NACK information with the transmit power.

With the second power control method, since the UE actually receives 4 transport blocks, the UE determines that S=4, since there are 2 PDSCHs with multi-codeword transmission mode and with two codewords being scheduled concurrently, the UE determines that $S_1=2$, and then the UE determines $n_{HARQ}=S-S_1=2$, and using $n_{HARQ}=2$ to calculate the power offset value corresponding to the number of bits carried on the PUCCH and further determines the transmit power of the PUCCH and transmits the bundled ACK/NACK information with the transmit power.

With the third power control method, since the UE actually receives 4 transport blocks, the UE determines that S=4, since there are 2 PDSCHs with multi-codeword transmission mode and with two codewords being scheduled concurrently, the UE determines that $S_1=2$, and moreover the UE determines that one PDSCH (possibly including 1 or 2 transport blocks when using the multi-codeword transmission mode) in the downlink sub-frame 1 of the downlink carrier 1 has been missed, that is, P=1, and then the UE determines $n_{HARQ}=S-S_1+P=3$, and uses $n_{HARQ}=3$ to calculate the power offset value corresponding to the number of bits carried on the PUCCH and further determines the transmit power of the PUCCH and transmits the bundled ACK/NACK information with the transmit power.

Second Embodiment

Figure 4B:
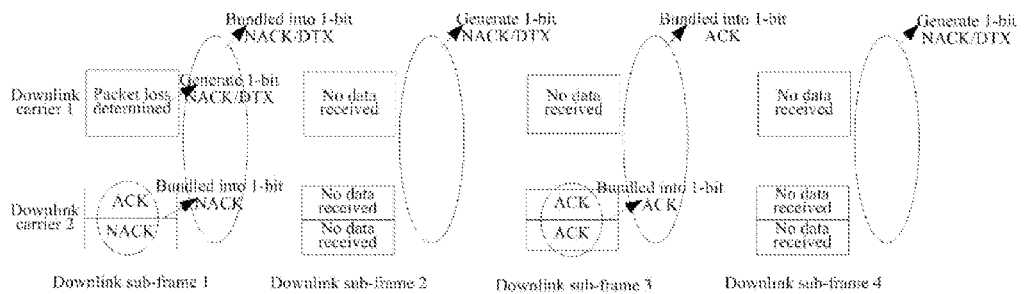
FIG. 4B is a schematic diagram of information bundling according to a second embodiment of the invention.
Figure 4C:
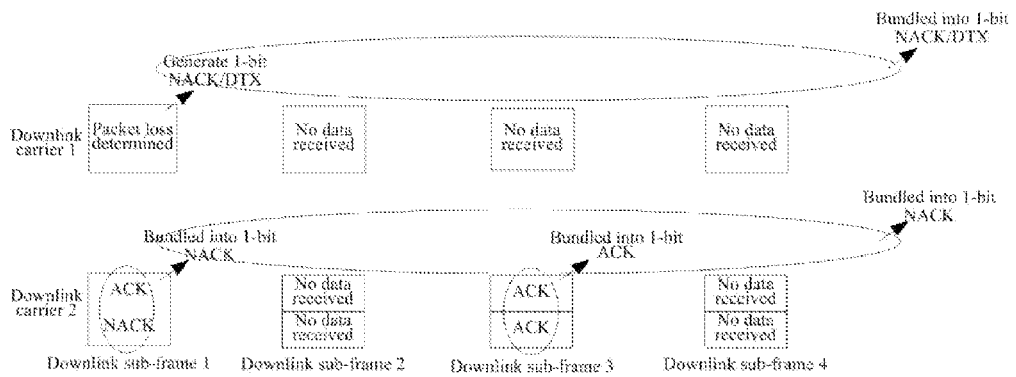
FIG. 4C is a schematic diagram of alternative information bundling according to a second embodiment of the invention.
Figure 4D:
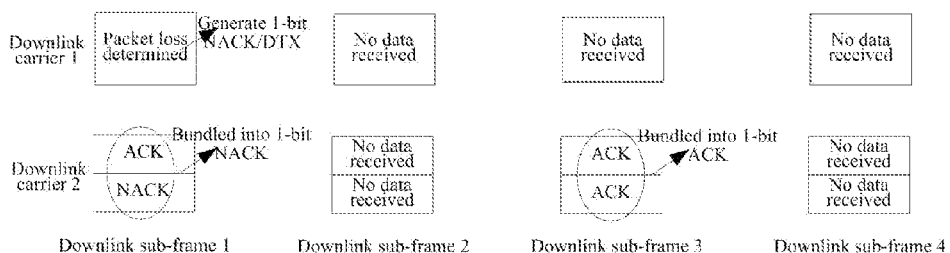
FIG. 4D is a schematic diagram of further alternative information bundling according to a second embodiment of the invention.

A UE is configured with two downlink carriers, where the downlink carrier 1 is a primary downlink carrier, and the downlink carrier 1 is configured with a multi-codeword transmission mode while the downlink carrier 2 is configured with a single-codeword transmission mode, and M=4, that is, the UE needs to feed back ACK/NACK information of four downlink sub-frames in the current uplink sub-frame; and a base station schedules the downlink sub-frames 1 and 2 on the downlink carrier 1, but the packets in the downlink sub-frames 1 and 2 have been missed at the UE side, and the base station schedules the downlink sub-frames 1, 2 and 3 on the downlink carrier 2, but the packet in the downlink sub-frame 2 has been missed at the UE side, as illustrated in FIG. 4B to FIG. 4D; the PUCCH format 1b with channel selection or the PUCCH format 3 is adopted as the transmission scheme for the ACK/NACK information, and the ACK/NACK information will be spatially bundled, and a specific flow of PUCCH power control is as follows:

With spatial bundling+frequency-domain bundling, as illustrated in FIG. 4B:

The UE needs to feed back 4-bit ACK/NACK information for the downlink carriers 1 and 2 after spatial bundling+frequency-domain bundling according to the configuration of the UE; the UE determines ACK/NACK information corresponding to the downlink sub-frames 1 and 3 using spatial bundling and frequency-domain bundling, and since the UE does not receive data packet in the downlink sub-frame 2 and 4, the UE generates 1-bit NACK/DTX information as the feedback information of the downlink sub-frame 2 and 4 respectively, so the UE actually transmits 4-bit ACK/NACK information in detail as [NACK/DTX,NACK/DTX,ACK, NACK/DTX]; and With the first power control method, the UE determines that $n_{HARQ}=M=4$ regardless of how many transport packets has been received by the UE actually, that is, the UE uses $n_{HARQ}=4$ to calculate the power offset value corresponding to the number of bits carried on the PUCCH and further determines the transmit power of the PUCCH and transmits the bundled ACK/NACK information with the transmit power.

With the second power control method, since the UE actually receives data packets only in the downlink sub-frames 1 and 3, the UE determines that $M_1=2$, and then determines that $n_{HARQ}=M_1=2$, that is, the UE uses $n_{HARQ}=2$ to calculate the power offset value corresponding to the number of bits carried on the PUCCH and further determines the transmit power of the PUCCH and transmits the bundled ACK/NACK information with the transmit power.

With the third power control method, since the UE actually receives data packets only in the downlink sub-frames 1 and 3, the UE determines that $M_1=2$, and if there is a time-domain DAI in the downlink scheduling signaling (DL grant), then the UE can determine that one packet in the downlink sub-frame 2 has been missed, that is, $P_1=1$, and then the UE determines $n_{HARQ}=M_1+P_1=3$, that is, the UE uses $n_{HARQ}=3$ to calculate the power offset value corresponding to the number of bits carried on the PUCCH and further determines the transmit power of the PUCCH and transmits the bundled ACK/NACK information with the transmit power.

With spatial bundling+time-domain bundling, as illustrated in FIG. 4C:

In a first scheme of spatial bundling+time-domain bundling, for the downlink carriers 1 and 2, the UE performs spatial bundling across multiple codewords within a downlink sub-frame and performs time-domain bundling across M sub-frames on each carrier and generates 1-bit bundled ACK/NACK information per carrier, thus 2-bit bundled ACK/NACK information and 2-bit assistant information (to indicate the number of sub-frames in which the UE receives dynamical downlink data) have been generated in total, that is, the UE actually transmits L=4-bit ACK/NACK information; or in a second scheme of spatial bundling+time-domain bundling, for each downlink carrier, the UE performs spatial bundling across multiple codewords within a downlink sub-frame and generates 2-bit time-domain bundled ACK/NACK information for each downlink carrier, where the time-domain bundled information indicates the number of consecutive sub-frames which is correctly received starting from the first scheduled sub-frame on the downlink carrier, thus 4-bit bundled ACK/NACK information have been generated in total, that is, the UE actually transmits L=4-bit ACK/NACK information;

With the first power control method, the UE determines that $n_{HARQ}=L=4$ regardless of how many transport packets have been received by the UE actually, that is, the UE uses $n_{HARQ}=4$ to calculate the power offset value corresponding to the number of bits carried on the PUCCH and further determines the transmit power of the PUCCH and transmits the bundled ACK/NACK information with the transmit power.

With the second power control method, since the UE actually receives data only on the downlink carrier 2, in a first scheme of time-domain bundling, since $L_1$ includes only the ACK/NACK information and 2-bit assistant information corresponding to the downlink carrier 2, the UE determines that $L_1=3$, and then determines $n_{HARQ}=L_1=3$, that is, the UE uses $n_{HARQ}=3$ to calculate the power offset value corresponding to the number of bits carried on the PUCCH and further determines the transmit power of the PUCCH and transmits the bundled ACK/NACK information with the transmit power; and in a second scheme of time-domain bundling, since $L_1$ includes only 2-bit time-domain bundled ACK/NACK information corresponding to the downlink carrier 2 to indicate the number of consecutive sub-frames which are correctly received starting from the first scheduled sub-frame on the downlink carrier 2, the UE determines that $L_1=2$, and then determines $n_{HARQ}=L_1=2$, that is, the UE uses $n_{HARQ}=2$ to calculate the power offset value corresponding to the number of bits carried on the PUCCH and further determines the transmit power of the PUCCH and transmits the bundled ACK/NACK information with the transmit power.

With the third power control method, although the UE actually receives data only on the downlink carrier 2, the UE can determine at least one packet on the downlink carrier 1 has been missed according to the frequency domain DAI value in the DL grant, that is, in a first scheme of time-domain bundling, since $L_2$ includes ACK/NACK information and 2-bit assistant information corresponding to the downlink carrier with received data and the downlink carrier with lost packets being detected, the UE determines that $L_2=4$, and then determines $n_{HARQ}=L_2=4$, that is, the UE uses $n_{HARQ}=4$ to calculate the power offset value corresponding to the number of bits carried on the PUCCH and further determines the transmit power of the PUCCH and transmits the bundled ACK/NACK information with the transmit power; and in a second scheme of time-domain bundling, since $L_2$ includes time-domain bundled ACK/NACK information, corresponding to the downlink carrier with received data and the downlink carrier with lost packets being detected, to indicate the number of consecutive sub-frames which are correctly received starting from the first scheduled sub-frame over the downlink carrier 2, the UE determines that $L_2=2+2=4$, and then determines $n_{HARQ}=L_2=4$, that is, the UE uses $n_{HARQ}=4$ to calculate the power offset value corresponding to the number of bits carried on the PUCCH and further determines the transmit power of the PUCCH and transmits the bundled ACK/NACK information with the transmit power.

With spatial bundling+K-bit information for indicating the number of data packet correctly received by the UE, as illustrated in FIG. 4D:

The UE generates K bits to indicate the number of data packet correctly received in the four downlink sub-frames on the two downlink carriers after spatial bundling, for example, with K=4, "0000" indicates that there is a loss of a packet or no data packet is received or all the received data packets are incorrect in the four downlink sub-frames on the two downlink carriers, and the remaining statuses of the 4 bits indicates respectively the number of data packet correctly received by the UE in other scenarios than the foregoing cases (which can indicate the number of 1 to 15 correctly received data packets separately, and if there are more than 15 data packets scheduled for the UE, then two or more than two numbers of correctly received data packets shall be indicated by the same status of the 4 bits, which can be call as status multiplexing), and since the UE determines that one data packet on the downlink carrier 1 has been missed, the UE transmits 4-bit information "0000".

With the first, second or third power control method, the UE determines that $n_{HARQ}=K=4$, that is, the UE uses $n_{HARQ}=4$ to calculate the power offset value corresponding to the number of bits carried on the PUCCH and further determines the transmit power of the PUCCH and transmits the bundled ACK/NACK information with the transmit power.

Third Embodiment

Figure 4E:
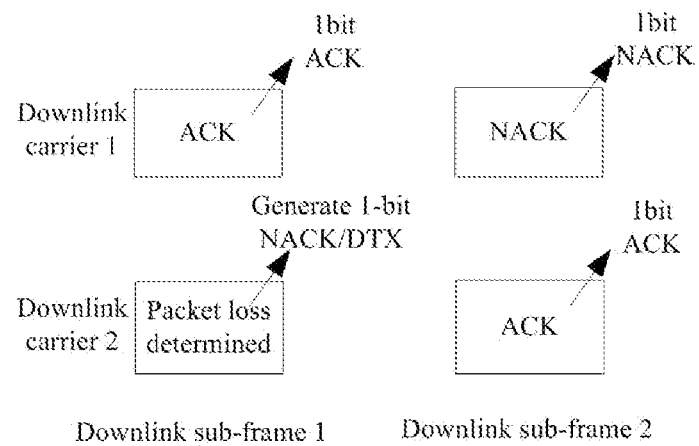
FIG. 4E is a schematic diagram of information bundling according to a third embodiment of the invention.
Figure 5:
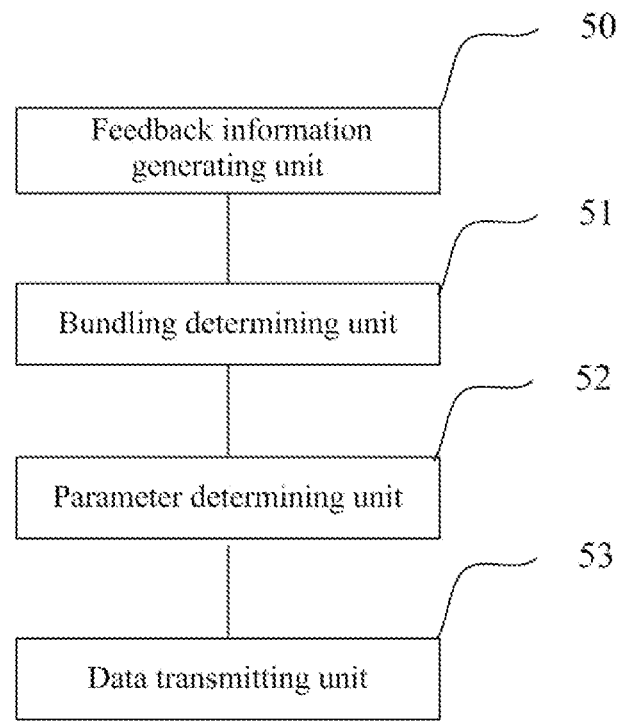
FIG. 5 is a schematic structural diagram of a UE according to an embodiment of the invention.

A UE is configured with two downlink carriers, where the downlink carrier 1 is a primary downlink carrier, and both the downlink carrier 1 and the downlink carrier 2 are configured with a single-codeword transmission mode, and M=2, that is, the UE needs to feed back ACK/NACK information of two downlink sub-frames in the current uplink sub-frame; and a base station schedules the downlink sub-frames 1 and 2 on both the downlink carrier 1 and the downlink carrier 2, but one packet in the downlink sub-frame 1 on the downlink carrier 2 has been missed at the UE side, as illustrated in FIG. 5; the PUCCH format 1b with channel selection or the PUCCH format 3 is adopted as the transmission scheme for the ACK/NACK information, and the ACK/NACK information will not be bundled, and a specific flow of PUCCH power control is as follows:

As illustrated in FIG. 4E, the UE needs to feed back 4-bit ACK/NACK information according to the configuration of the UE; and the UE generates the ACK/NACK information for the downlink sub-frame 1 on the downlink carrier 1 according to the received data, and the UE determines that one packet in the downlink sub-frame 1 on the downlink carrier 2 has been missed according to the DAI value in the DL grant and generates 1-bit NACK/DTX information as the feedback information of this downlink sub-frame, and then the UE actually transmits 4-bit ACK/NACK information in detail as [ACK,NACK/DTX,NACK,ACK];

With a power control method A, since the UE actually receives 3 transport blocks, the UE determines that S=4, and then determines $n_{HARQ}=S=3$, and the UE uses $n_{HARQ}=3$ to calculate the power offset value corresponding to the number of bits carried on the PUCCH and further determines the transmit power of the PUCCH and transmits the bundled ACK/NACK information with the transmit power.

With a power control method B, since the UE actually receives 3 transport blocks, the UE determines that S=4, and moreover the UE determines that 1 transport block in the downlink sub-frame 1 on the downlink carrier 2 has been missed, that is, P=1, and then the UE determines $n_{HARQ}=S+P=4$, and uses $n_{HARQ}=4$ to calculate the power offset value corresponding to the number of bits carried on the PUCCH and further determines the transmit power of the PUCCH and transmits the bundled ACK/NACK information with the transmit power.

As illustrated in FIG. 5, an embodiment of the invention further provides a User Equipment (UE) including:

A feedback information generating unit 50 configured to receive downlink data and to generate ACK/NACK information;

A bundling determining unit 51 configured to determine whether to bundle the generated ACK/NACK information;

A parameter determining unit 52 configured to determine a parameter value of the number of ACK/NACK bits, $n_{HARQ}$, according to a bundling scheme used for the ACK/NACK information upon determining to bundle the generated ACK/NACK information; and A data transmitting unit 53 configured to determine a power offset value corresponding to the number of bits carried on a PUCCH using the parameter value of the number of ACK/NACK bits, $n_{HARQ}$, and then to determine a transmit power of the PUCCH based on the power offset value and to transmit the bundled ACK/NACK information on the PUCCH with the transmit power.

The bundling scheme is one or any combination of a spatial bundling scheme, a time-domain bundling scheme, a frequency-domain bundling scheme and a bundling scheme with an indicator of the number of data packets/transport blocks correctly received by the UE.

In an implementation, the parameter determining unit 52 is configured:

to determine the parameter value of the number of ACK/NACK bits, $n_{HARQ}$, according to the number of bits of the bundled ACK/NACK information. Particularly:

With a spatial bundling scheme, the parameter determining unit 52 determines the number of bits of the bundled ACK/NACK information as $N \times M_i$ where N is the number of downlink carriers configured for the UE, and M is the number of downlink sub-frames for which the UE needs to feed back ACK/NACK information in the current uplink sub-frame, and then determines the parameter value of the number of ACK/NACK bits, $n_{HARQ}$, as N×M; or With a spatial bundling scheme, the parameter determining unit 52 determines the number of bits of the bundled ACK/NACK information as $$\sum_{i=1}^{N} M_i,$$

where N is the number of downlink carriers configured for the UE, and $M_i$ is the number of downlink sub-frames on the i-th downlink carrier for which the UE needs to feed back ACK/NACK information in the current uplink sub-frame, and then determines the parameter value of the number of ACK/NACK bits, $n_{HARQ}$, as $$\sum_{i=1}^{N} M_i;$$

or

With a spatial bundling+frequency-domain bundling scheme, the parameter determining unit 52 determines the number of bits of the bundled ACK/NACK information as M, where M is the number of downlink sub-frames for which the UE needs to feed back ACK/NACK information in the current uplink sub-frame, and then determines the parameter value of the number of ACK/NACK bits, $n_{HARQ}$, as M; or With a spatial bundling+time-domain bundling scheme, the parameter determining unit 52 determines the number of bits of the bundled ACK/NACK information as L, where L is the number of information bits obtained by the UE performing spatial bundling and time-domain bundling on ACK/NACK information of M downlink sub-frames on N downlink carriers, N is the number of downlink carriers configured for the UE, and M is the number of downlink sub-frames for which the UE needs to feed back ACK/NACK information in the current uplink sub-frame, and then determines the parameter value of the number of ACK/NACK bits, $n_{HARQ}$, as L; or With a spatial bundling scheme+a bundling scheme with an indicator of the number of data packets correctly received by the UE, the parameter determining unit 52 determines the number of bits of the bundled ACK/NACK information as K, where K is the number of information bits for indicating the number of data packets correctly received by the UE (that is, the total the number of correctly received PDSCHs and the PDCCHs indicating downlink SPS release), and then determines the parameter value of the number of ACK/NACK bits, $n_{HARQ}$, as K.

In another implementation, the parameter determining unit 52 is configured:

to determine the parameter value of the number of ACK/NACK bits, $n_{HARQ}$, according to the bundling scheme used for the ACK/NACK information and downlink carriers on which UE receives downlink data and/or downlink sub-frames in which UE receives downlink data. The downlink data includes data transmitted on a Physical Downlink Shared Channel (PDSCH) and data transmitted on a Physical Downlink Shared Channel (PDCCH) indicating downlink SPS release. Particularly:

With a spatial bundling scheme, based on the downlink carriers on which downlink data is received by the UE and/or the downlink sub-frames in which downlink data is received by the UE, the parameter determining unit 52 determines the total number of transport blocks received by the UE and the PDCCHs indicating downlink SPS release received by the UE as S, and determines the number of received PDSCHs with a multi-codeword transmission mode and with multiple codewords being scheduled concurrently as $S_1$, and then the parameter determining unit 52 determines the parameter value of the number of ACK/NACK bits, $n_{HARQ}$, as $S-S_1$; or With a spatial bundling+frequency-domain bundling scheme, based on the downlink carriers on which downlink data is received by the UE and/or the downlink sub-frames in which downlink data is received by the UE, the parameter determining unit 52 determines the number of downlink sub-frames in which the UE receives at least a transport block and/or a PDCCH indicating downlink SPS release among M downlink sub-frames as $M_1$, where M is the number of downlink sub-frames for which the UE needs to feed back ACK/NACK information in the current uplink sub-frame, and then the parameter determining unit 52 determines the parameter value of the number of ACK/NACK bits, $n_{HARQ}$, as $M-M_1$; or With a spatial bundling+time-domain bundling scheme, based on the downlink carriers on which downlink data is received by the UE and/or the downlink sub-frames in which downlink data is received by the UE, the parameter determining unit 52 determines the number of information bits obtained by the UE performing spatial bundling and time-domain bundling on ACK/NACK information of M downlink sub-frames on $N_1$ downlink carriers as $L_1$, where the $N_1$ downlink carriers are downlink carriers on which the UE receives a transport block and/or a PDCCH indicating downlink SPS release, and M is the number of downlink sub-frames for which the UE needs to feed back ACK/NACK information in the current uplink sub-frame, and then the parameter determining unit 52 determines the parameter value of the number of ACK/NACK bits, $n_{HARQ}$, as $L_1$; or With a spatial bundling scheme+a bundling scheme with an indicator of the number of data packets correctly received by the UE, based on the downlink carriers on which downlink data is received by the UE and/or the downlink sub-frames in which downlink data is received by the UE, the parameter determining unit 52 determines the number of information bits for indicating the number of data packets correctly received by the UE as K, and then determines the parameter value of the number of ACK/NACK bits, $n_{HARQ}$, as K.

In a further implementation, the parameter determining unit 52 is configured:

To determine the parameter value of the number of ACK/NACK bits, $n_{HARQ}$, according to the bundling scheme used for the ACK/NACK information and downlink carriers on which the UE receives downlink data and/or downlink sub-frames in which UE receives downlink data and downlink carriers on which UE does not receive downlink data but detects at least one downlink data has been missed and/or downlink sub-frames in which UE UE does not receive downlink data but detects at least one downlink data has been missed. The downlink data in the foregoing second and third solutions includes data transmitted on a Physical Downlink Shared Channel (PDSCH) and data transmitted on a Physical Downlink Control Channel (PDCCH) indicating downlink SPS release. Particularly:

With a spatial bundling scheme, based on the downlink carriers on which downlink data is received by the UE and/or the downlink sub-frames in which downlink data is received by the UE, the parameter determining unit 52 determines the total number of transport blocks received by the UE and PDCCHs indicating downlink SPS release received by the UE as S, and determines the number of received PDSCHs with a multi-codeword transmission mode and with multiple codewords being scheduled concurrently as $S_1$, and based on the downlink carriers on which UE does not receive downlink data but detects at least one data has been missed and/or the downlink sub-frames in which UE does not receive downlink data but detects at least one data has been missed, the parameter determining unit 52 determines the total number of missed PDSCHs detected by the UE and the missed PDCCHs indicating downlink SPS release detected by the UE, as P, and then determines the parameter value of the number of ACK/NACK bits, $n_{HARQ}$, as $S-S_1+P$; or With a spatial bundling+frequency-domain bundling scheme, based on the downlink carriers on which downlink data is received by the UE and/or the downlink sub-frames in which downlink data is received by the UE, the parameter determining unit 52 determines the number of downlink sub-frames in which the UE receives at least a transport block and/or a PDCCH indicating downlink SPS release among M downlink sub-frames as $M_1$, and based on the downlink carriers on which UE does not receive downlink data but detects at least one data has been missed and/or the downlink sub-frames in which UE does not receive downlink data but detects at least one data has been missed, the parameter determining unit 52 determines the number of downlink sub-frames in which the UE does not receive data but detects at least one data has been missed among the M downlink sub-frames as $P_1$, where M is the number of downlink sub-frames for which the UE needs to feed back ACK/NACK information in the current uplink sub-frame, and then the parameter determining unit 52 determines the parameter value of the number of ACK/NACK bits, $n_{HARQ}$, as $M_1+P_1$; or With a spatial bundling+time-domain bundling scheme, based on the downlink carriers on which downlink data is received by the UE and/or the downlink sub-frames in which downlink data is received by the UE, and based on the downlink carriers on which UE does not receive downlink data but detects at least one data has been missed and/or the downlink sub-frames in which UE does not receive downlink data but detects at least one data has been missed, the parameter determining unit 52 determines the number of information bits obtained by the UE performing spatial bundling and time-domain bundling on ACK/NACK information of M downlink sub-frames on $N_2$ downlink carriers as $L_2$, where the $N_2$ downlink carriers are downlink carriers on which the UE receives at least a transport block and/or a PDCCH indicating downlink SPS release and downlink carriers on which the UE does not receive data but detects at least one data has been missed, where M is the number of downlink sub-frames for which the UE needs to feed back ACK/NACK information in the current uplink sub-frame, and then the parameter determining unit 52 determines the parameter value of the number of ACK/NACK bits, $n_{HARQ}$, as $L_2$; or With a spatial bundling scheme+a bundling scheme with an indicator of the number of data packets correctly received by the UE, based on the downlink carriers on which downlink data is received by the UE and/or the downlink sub-frames in which downlink data is received by the UE, and based on the downlink carriers on which UE does not receive downlink data but detects at least one data has been missed and/or the downlink sub-frames in which UE does not receive downlink data but detects at least one data has been missed, the parameter determining unit 52 determines the number of information bits for indicating the number of data packets correctly received by the UE, as K, and then determines the parameter value of the number of ACK/NACK bits, $n_{HARQ}$, as K.

The parameter determining unit 52 is further configured:

To determine the parameter value of the number of ACK/NACK bits, $n_{HARQ}$, according to the following data upon determining not to bundle the generated ACK/NACK information: transport blocks received by the UE and PDCCHs indicating downlink SPS release received by the UE. Particularly:

The parameter determining unit 52 determines the parameter value of the number of ACK/NACK bits, $n_{HARQ}$, as S, where S is the total number of transport blocks received by the UE and PDCCHs indicating downlink SPS release received by the UE.

The parameter determining unit 52 is further configured:

To determine the parameter the value of the number of ACK/NACK bits, $n_{HARQ}$, according to the following data upon determining not to bundle the generated ACK/NACK information: transport blocks received by the UE and PDCCHs indicating downlink SPS release received by the UE, and the missed transport blocks/PDSCHs detected by the UE, and the missed PDCCHs indicating downlink SPS release detected by the UE. Particularly:

The parameter determining unit 52 determines the parameter value of the number of ACK/NACK bits, $n_{HARQ}$, as S+P, where S is total number of transport blocks received by the UE and PDCCHs indicating downlink SPS release received by the UE, and P is the total number of missed transport blocks/PDSCHs detected by the UE and the missed PDCCHs indicating downlink SPS release detected by the UE.

Preferably after the parameter determining unit 52 determines the parameter value of the number of ACK/NACK bits, $n_{HARQ}$ and before the parameter determining unit 52 determines the power offset value corresponding to the number of bits carried on the PUCCH, if an uplink sub-frame in which the parameter determining unit 52 transmits the ACK/NACK information is an SR sub-frame and SR information and the ACK/NACK information is jointly encoded for transmission, then 1 is added to the parameter value of the number of ACK/NACK bits, $n_{HARQ}$, which is used to calculate the power offset value, and parameter determining unit 52 determines the power offset corresponding to the number of bits carried on the PUCCH using $n_{HARQ}$ with 1 added thereto, and then determines the transmit power of the PUCCH based on the power offset value and transmits the bundled ACK/NACK information on the PUCCH with the transmit power; or parameter determining unit 52 introduces a parameter value of the number of SR bits, $n_{SR}$, directly to a formula which is used to calculate the power offset value corresponding to the number of bits carried on the PUCCH, and if an uplink sub-frame in which the ACK/NACK information is transmitted is an SR sub-frame and SR information and the ACK/NACK information is jointly encoded for transmission, then $n_{SR}=1$; otherwise, $n_{SR}=0$.

The parameter determining unit 52 is configured to determine the transmit power of the PUCCH in an uplink sub-frame i using the following formula of:

$$P_{PUCCH}(i)=\min(P_{CMAX,c}(i), P_{0\_PUCCH}+PL_c+h(n_{CQI}, n_{HARQ}, n_{SR})+\Delta_{F\_PUCCH}(F)+\Delta_{TxD}(F')+g(i));$$

Where $P_{CMAX,c}(i)$ is higher layer-configured maximum transmit power of the UE;

$\Delta_{F\_PUCCH}(F)$ is a higher layer-configured power offset value of a different PUCCH format from the PUCCH format 1a;

$h(n_{CQI}, n_{HARQ}, n_{SR})$ is a power offset value corresponding to the number of bits carried on the PUCCH, where $n_{CQI}$ is a parameter value of the number of bits of Channel State Information (CSI), $n_{HARQ}$ is the parameter value of the number of ACK/NACK bits, and $n_{SR}$ is a parameter value of the number of bits of a Scheduling Request (SR);

$P_{0\_PUCCH}$ is a target value of the transmit power of the PUCCH;

g(i) is an accumulative amount of power control commands;

$PL_c$ is the value of a path loss measured by the UE; and $\Delta_{TxD}(F')$ is a higher layer-configured value of transmit power adjustment for the transmit diversity scheme of the UE.

In summary, advantages of the invention include:

In the solution according to the embodiments of the invention, a UE receives downlink data and generates ACK/NACK information; determines whether to bundle the generated ACK/NACK information, and upon determining to bundle the generated ACK/NACK information, bundles the ACK/NACK information using a predefined bundling scheme and determines the parameter value of the number of ACK/NACK bits, $n_{HARQ}$, according to the bundling scheme used for the ACK/NACK information; and determines the power offset value corresponding to the number of bits carried on the PUCCH using $n_{HARQ}$, and then determines the transmit power of the PUCCH based on the power offset value and transmits the bundled ACK/NACK information on the PUCCH with the transmit power.

As can be apparent, in the invention, when a UE needs to bundle the generated ACK/NACK information, the UE shall bundle the ACK/NACK information using the predefined bundling scheme and determines $n_{HARQ}$ according to the bundling scheme and uses $n_{HARQ}$ to determine the transmit power of the PUCCH, and since the number of bundled ACK/NACK feedback bits is far smaller than the number of actually received transport blocks in most cases, upon determining the parameter value of the number of ACK/NACK bits, $n_{HARQ}$, according to the bundling scheme used for the ACK/NACK information, it can be ensured that the actual transmit power of the UE matches to the number of bits of the actually transmitted information as much as possible, thereby determining the PUCCH transmit power of the UE more reasonably, avoiding a power waste and improving the power utilization ratio of the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A power control method of a Physical Uplink Control Channel, PUCCH, in a Long Term Evolution Advanced system, comprising:
   receiving, by a User Equipment, UE, downlink data and generating positive acknowledgement, ACK,/negative acknowledgment, NACK, information;
   determining, by the UE, whether to bundle the generated ACK/NACK information;
   determining, by the UE, the parameter value of the number of ACK/NACK bits, $n_{HARQ}$, according to a bundling scheme used for the ACK/NACK information upon determining to bundle the generated ACK/NACK information; and
   determining, by a UE, a power offset value corresponding to the number of bits carried on the PUCCH using the parameter value of the number of ACK/NACK bits, $n_{HARQ}$, and then determining the transmit power of the PUCCH based on the power offset value and transmitting the bundled ACK/NACK information on the PUCCH with the transmit power.

2. The method according to claim 1, wherein the bundling scheme is one or any combination of a spatial bundling scheme, a time-domain bundling scheme, a frequency-domain bundling scheme and a bundling scheme with an indicator of the number of data packets/transport blocks correctly received by the UE.

3. The method according to claim 1, wherein determining by the UE the parameter value of the number of ACK/NACK bits, $n_{HARQ}$, according to the bundling scheme used for the ACK/NACK information, comprises:
   determining, by the UE, the parameter value of the number of ACK/NACK bits, $n_{HARQ}$, according to the number of bits of the bundled ACK/NACK information.

4. The method according to claim 3, wherein when the UE adopts a spatial bundling scheme, the UE determines the parameter value of the number of ACK/NACK bits, $n_{HARQ}$, as N×M, wherein N is the number of downlink carriers configured for the UE, and M is the number of downlink sub-frames for which the UE needs to feed back ACK/NACK information in a current uplink sub-frame; or
   when the UE adopts a spatial bundling scheme, the UE determines the parameter value of the number of ACK/NACK bits, $n_{HARQ}$, as $$\sum_{i=1}^{N} M_i,$$

wherein N is the number of downlink carriers configured for the UE, and $M_i$ is the number of downlink sub-frames on the i-th downlink carrier for which the UE needs to feed back ACK/NACK information in the current uplink sub-frame; or when the UE adopts a spatial bundling and frequency-domain bundling scheme, the UE determines the parameter value of the number of ACK/NACK bits, $n_{HARQ}$, as M, wherein M is the number of downlink sub-frames for which the UE needs to feed back ACK/NACK information in the current uplink sub-frame; or when the UE adopts a spatial bundling and time-domain bundling scheme, the UE determines the parameter value of the number of ACK/NACK bits, $n_{HARQ}$, as L, wherein L is the number of information bits obtained by the UE performing spatial bundling and time-domain bundling on ACK/NACK information of M downlink sub-frames on N downlink carriers, N is the number of downlink carriers configured for the UE, and M is the number of downlink sub-frames for which the UE needs to feed back ACK/NACK information in the current uplink sub-frame; or when the UE adopts a spatial bundling scheme and a bundling scheme with an indicator of the number of data packets correctly received by the UE, the UE determines the parameter value of the number of ACK/NACK bits, $n_{HARQ}$, as K, wherein K is the number of information bits for indicating the number of data packets correctly received by the UE.

5. The method according to claim 1, wherein determining by the UE the parameter value of the number of ACK/NACK bits, $n_{HARQ}$, according to the bundling scheme used for the ACK/NACK information, comprises:

determining, by the UE, the parameter value of the number of ACK/NACK bits, $n_{HARQ}$, according to the bundling scheme used for the ACK/NACK information, and downlink carriers on which the UE receives downlink data and/or downlink sub-frames in which the UE receives downlink data.

6. The method according to claim 4, wherein the downlink data comprises data transmitted on a Physical Downlink Shared Channel, PDSCH, and data transmitted on a Physical Downlink Control Channel, PDCCH, indicating downlink SPS release.

7. The method according to claim 5, wherein when the UE adopts a spatial bundling scheme, the UE determines the parameter value of the number of ACK/NACK bits, $n_{HARQ}$, as $S-S_1$, wherein S is the total number of transport blocks received by the UE and PDCCHs indicating downlink SPS release received by the UE, and $S_1$ is the number of received PDSCHs with a multi-codeword transmission mode and with multiple codewords being scheduled concurrently; or when the UE adopts a spatial bundling and frequency-domain bundling scheme, the UE determines the parameter value of the number of ACK/NACK bits, $n_{HARQ}$, as $M_1$, wherein $M_1$ is the number of downlink sub-frames in which the UE receives at least a transport block and/or a PDCCH indicating downlink SPS release among M downlink sub-frames, and M is the number of downlink sub-frames for which the UE needs to feed back ACK/NACK information in a current uplink sub-frame; or when the UE adopts a spatial bundling and time-domain bundling scheme, the UE determines the parameter value of the number of ACK/NACK bits, $n_{HARQ}$, as $L_1$, wherein $L_1$ is the number of information bits obtained by the UE performing spatial bundling and time-domain bundling on ACK/NACK information of M downlink sub-frames on $N_1$ downlink carriers, the $N_1$ downlink carriers are the downlink carriers on which the UE receives at least a transport block and/or a PDCCH indicating downlink SPS release, and M is the number of downlink sub-frames for which the UE needs to feed back ACK/NACK information in the current uplink sub-frame; or when the UE adopts a spatial bundling scheme and a bundling scheme with an indicator of the number of data packets correctly received by the UE, the UE determines the parameter value of the number of ACK/NACK bits, $n_{HARQ}$, as K, wherein K is the number of information bits for indicating the number of data packets correctly received by the UE.

8. The method according to claim 1, wherein determining by the UE the parameter value of the number of ACK/NACK bits, $n_{HARQ}$, according to the bundling scheme used for the ACK/NACK information, comprises:

determining, by the UE, the parameter value of the number of ACK/NACK bits, $n_{HARQ}$, according to the bundling scheme used for the ACK/NACK information, and downlink carriers on which the UE receives downlink data and/or downlink sub-frames in which the UE receives downlink data, and downlink carriers on which the UE does not receive downlink data but detects at least one downlink data has been missed and/or downlink sub-frames in which the UE does not receive downlink data but detects at least one downlink data has been missed.

9. The method according to claim 8, wherein when the UE adopts a spatial bundling scheme, the UE determines the parameter value of the number of ACK/NACK bits, $n_{HARQ}$, as $S-S_1+P$, wherein S is the total number of transport blocks received by the UE and PDCCHs indicating downlink SPS release received by the UE, S1 is the number of received PDSCHs with a multi-codeword transmission mode and with multiple codewords being scheduled concurrently, and P is the total number of missed PDSCHs detected by the UE and missed PDCCHs indicating downlink SPS release detected by the UE; or when the UE adopts a spatial bundling and frequency-domain bundling scheme, the UE determines the parameter value of the number of ACK/NACK bits, $n_{HARQ}$, as $M_1+P_1$, wherein $M_1$ is the number of downlink sub-frames in which the UE receives at least a transport block and/or a PDCCH indicating downlink SPS release among M downlink sub-frames, $P_1$ is the number of downlink sub-frames in which the UE does not receive data but detects at least one data has been missed among the M downlink sub-frames, and M is the number of downlink sub-frames for which the UE needs to feed back ACK/NACK information in a current uplink sub-frame; or when the UE adopts a spatial bundling and time-domain bundling scheme, the UE determines the parameter value of the number of ACK/NACK bits, $n_{HARQ}$, as $L_2$, wherein $L_2$ is the number of information bits obtained by the UE performing spatial bundling and time-domain bundling on ACK/NACK information of M downlink sub-frames on $N_2$ downlink carriers, the $N_2$ downlink carriers include the downlink carriers on which the UE receives at least a transport block and/or a PDCCH indicating downlink SPS release and the downlink carriers on which the UE does not receive data but detects at least one data has been missed, and M is the number of downlink sub-frames for which the UE needs to feed back ACK/NACK information in the current uplink sub-frame; or when the UE adopts a spatial bundling scheme and a bundling scheme with an indicator of the number of data packets correctly received by the UE, the UE determines the parameter value of the number of ACK/NACK bits, $n_{HARQ}$, as K, wherein K the number of information bits for indicating the number of data packets correctly received by the UE.

10. The method according to claim 1, wherein when the UE determines not to bundle the generated ACK/NACK information, the method further comprises:

determining, by the UE, the parameter value of the number of ACK/NACK bits, $n_{HARQ}$, according to the transport blocks received by the UE and PDCCHs indicating downlink SPS release received by the UE.

11. The method according to claim 10, wherein the UE determines the parameter value of the number of ACK/NACK bits, $n_{HARQ}$, as S, wherein S is the total number of the transport blocks received by the UE and the PDCCHs indicating downlink SPS release received by the UE.

12. The method according to claim 1, wherein when the UE determines not to bundle the generated ACK/NACK information, the method further comprises:

determining, by the UE, the parameter value of the number of ACK/NACK bits, $n_{HARQ}$, according to the transport blocks received by the UE and PDCCHs indicating downlink SPS release received by the UE, and missed transport blocks/PDSCHs detected by the UE, and missed PDCCHs indicating downlink SPS release detected by the UE.

13. The method according to claim 12, wherein the UE determines the parameter value of the number of ACK/NACK bits, $n_{HARQ}$, as S+P, wherein S is the total number of transport blocks received by the UE and the PDCCHs indicating downlink SPS release received by the UE, and P is the total number of missed transport blocks/PDSCHs detected by the UE and the missed PDCCHs indicating downlink SPS release detected by the UE.

14. The method according to claim 1, wherein the UE determines the transmit power of the PUCCH in an uplink sub-frame i using the following formula of:

$$P_{PUCCH}(i)=\min(P_{CMAX,c}(i), P_{0\_PUCCH}+PL_c+h(n_{CQI}, n_{HARQ}, n_{SR})+\Delta_{F\_PUCCH}(F)+\Delta_{TxD}(F')+g(i));$$

wherein $P_{CMAX,c}(i)$ is higher layer-configured maximum transmit power of the UE;

$\Delta F_{\_PUCCH}(F)$ is a higher layer-configured power offset value of a different PUCCH format from a PUCCH format 1a;

$h(n_{CQI}, n_{HARQ}, n_{SR})$ is a power offset value corresponding to the number of bits carried on the PUCCH, wherein $n_{CQI}$ is a parameter value of the number of bits of Channel State Information, CSI, $n_{HARQ}$ is the parameter value of the number of ACK/NACK bits, and $n_{SR}$ is a parameter value of the number of bits of a Scheduling Request, SR;

$P_{0\_PUCCH}$ is a target value of the transmit power of the PUCCH;

g(i) is an accumulative amount of the power control commands;

$PL_c$ is the value of a path loss measured by the UE; and $\Delta_{TxD}(F')$ is a higher layer-configured value of transmit power adjustment for the transmit diversity scheme of the UE.

15. A User Equipment, UE, comprising:

a feedback information generating unit configured to receive downlink data and to generate positive acknowledgement, ACK,/negative acknowledgment, NACK, information;

a bundling determining unit configured to determine whether to bundle the generated ACK/NACK information;

a parameter determining unit configured to determine the parameter value of the number of ACK/NACK bits, $n_{HARQ}$, according to a bundling scheme used for the ACK/NACK information upon determining to bundle the generated ACK/NACK information; and a data transmitting unit configured to determine a power offset value corresponding to the number of bits carried on a PUCCH using the parameter value of the number of ACK/NACK bits, $n_{HARQ}$, and then to determine the transmit power of the PUCCH based on the power offset value and to transmit the bundled ACK/NACK information on the PUCCH with the transmit power.

16. The UE according to claim 15, wherein the bundling scheme is one or any combination of a spatial bundling scheme, a time-domain bundling scheme, a frequency-domain bundling scheme and a bundling scheme with an indicator of the number of data packets/transport blocks correctly received by the UE.

17. The UE according to claim 15, wherein the parameter determining unit is configured:

to determine the parameter value of the number of ACK/NACK bits, $n_{HARQ}$, according to the number of bits of the bundled ACK/NACK information, or to determine the parameter value of the number of ACK/NACK bits, $n_{HARQ}$, according to the bundling scheme used for the ACK/NACK information, and downlink carriers on which the UE receives downlink data and/or downlink sub-frames in which the UE receives downlink data; or to determine the parameter value of the number of ACK/NACK bits, $n_{HARQ}$, according to the bundling scheme used for the ACK/NACK information, and downlink carriers on which UE receives downlink data and/or downlink sub-frames in which UE receives downlink data, and downlink carriers on which UE does not receive downlink data but detects at least one downlink data has been missed and/or downlink sub-frames in which the UE does not receive downlink data but detects at least one downlink data has been missed;

wherein the downlink data comprises data transmitted on a Physical Downlink Shared Channel, PDSCH, and data transmitted on a Physical Downlink Shared Channel, PDCCH, indicating downlink SPS release.

18. The UE according to claim 17, wherein when the parameter determining unit is configured to determine the parameter value of the number of ACK/NACK bits, $n_{HARQ}$, according to the number of bits of the bundled ACK/NACK information, the parameter determining unit is further configured:

to determine the parameter value of the number of ACK/NACK bits, $n_{HARQ}$, as N×M when the UE adopts a spatial bundling scheme, wherein N is the number of downlink carriers configured for the UE, and M is the number of downlink sub-frames for which the UE needs to feed back ACK/NACK information in the current uplink sub-frame; or to determine the parameter value of the number of ACK/NACK bits, $n_{HARQ}$, as $$\sum_{i=1}^{N} M_i$$

when the UE adopts a spatial bundling scheme, wherein N is the number of downlink carriers configured for the UE, and $M_i$ is the number of downlink sub-frames on the i-th downlink carrier for which the UE needs to feed back ACK/NACK information in a current uplink sub-frame; or to determine the parameter value of the number of ACK/NACK bits, $n_{HARQ}$, as M when the UE adopts a spatial bundling and frequency-domain bundling scheme, wherein M is the number of downlink sub-frames for which the UE needs to feed back ACK/NACK information in the current uplink sub-frame; or to determine the parameter value of the number of ACK/NACK bits, $n_{HARQ}$, as L when the UE adopts a spatial bundling and time-domain bundling scheme, wherein L is the number of information bits obtained by the UE performing spatial bundling and time-domain bundling on ACK/NACK information of M downlink sub-frames on N downlink carriers, N is the number of downlink carriers configured for the UE, and M is the number of downlink sub-frames for which the UE needs to feed back ACK/NACK information in the current uplink sub-frame; or to determine the parameter value of the number of ACK/NACK bits, $n_{HARQ}$, as K when the UE adopts a spatial bundling scheme and a bundling scheme with an indicator of the number of data packets correctly received by the UE, wherein K is the number of information bits for indicating the number of data packets correctly received by the UE; or wherein when the parameter determining unit is configured to determine the parameter value of the number of ACK/NACK bits, $n_{HARQ}$, according to the bundling scheme used for the ACK/NACK information, and the downlink carriers on which the UE receives downlink data and/or the downlink sub-frames in which the UE receives downlink data, the parameter determining unit is further configured:

to determine the parameter value of the number of ACK/NACK bits, $n_{HARQ}$, as S–S₁ when the UE adopts a spatial bundling scheme, wherein S is the total number of transport blocks received by the UE and the PDCCHs indicating downlink SPS release received by the UE, and S₁ is the number of received PDSCHs with a multi-codeword transmission mode and with multiple codewords being scheduled concurrently; or to determine the parameter value of the number of ACK/NACK bits, $n_{HARQ}$, as M₁ when the UE adopts a spatial bundling and frequency-domain bundling scheme, wherein M₁ is the number of downlink sub-frames in which the UE receives at least a transport block and/or a PDCCH indicating downlink SPS release among M downlink sub-frames, and M is the number of downlink sub-frames for which the UE needs to feed back ACK/NACK information in the current uplink sub-frame; or to determine the parameter value of the number of ACK/NACK bits, $n_{HARQ}$, as L₁ when the UE adopts a spatial bundling and time-domain bundling scheme, wherein L₁ is the number of information bits obtained by the UE performing spatial bundling and time-domain bundling on ACK/NACK information of M downlink sub-frames on N₁ downlink carriers, the N₁ downlink carriers are the downlink carriers on which the UE receives at least a transport block and/or a PDCCH indicating downlink SPS release, and M is the number of downlink sub-frames for which the UE needs to feed back ACK/NACK information in the current uplink sub-frame; or to determine the parameter value of the number of ACK/NACK bits, $n_{HARQ}$, as K when the UE adopts a spatial bundling scheme and a bundling scheme with an indicator of the number of data packets correctly received by the UE, wherein K is the number of information bits for indicating the number of data packets correctly received by the UE; or wherein when the parameter determining unit is configured to determine the parameter value of the number of ACK/NACK bits, $n_{HARQ}$, according to the bundling scheme used for the ACK/NACK information, and the downlink carriers on which the UE receives downlink data and/or the downlink sub-frames in which the UE receives downlink data, and the downlink carriers on which the UE does not receive downlink data but detects at least one downlink data has been missed and/or the downlink sub-frames in which the UE does not receive downlink data but detects at least one downlink data has been missed, the parameter determining unit is further configured:

to determine the parameter value of the number of ACK/NACK bits, $n_{HARQ}$, as S–S₁+P when the UE adopts a spatial bundling scheme, wherein S is the total number of transport blocks received by the UE and the PDCCHs indicating downlink SPS release received by the UE, S1 is the number of received PDSCHs with a multi-codeword transmission mode and with multiple codewords being scheduled concurrently, and P is the total number of missed PDSCHs detected by the UE and missed PDCCHs indicating downlink SPS release detected by the UE; or to determine the parameter value of the number of ACK/NACK bits, $n_{HARQ}$, as M₁+P₁ when the UE adopts a spatial bundling and frequency-domain bundling scheme, wherein M₁ is the number of downlink sub-frames in which the UE receives at least a transport block and/or a PDCCH indicating downlink SPS release among M downlink sub-frames, P₁ is the number of downlink sub-frames in which the UE does not receive data but detects at least one data has been missed among the M downlink sub-frames, and M is the number of downlink sub-frames for which the UE needs to feed back ACK/NACK information in a current uplink sub-frame; or to determine the parameter value of the number of ACK/NACK bits, $n_{HARQ}$, as L₂ when the UE adopts a spatial bundling and time-domain bundling scheme, wherein L₂ is the number of information bits obtained by the UE performing spatial bundling and time-domain bundling on ACK/NACK information of M downlink sub-frames on N₂ downlink carriers, the N₂ downlink carriers include the downlink carriers on which the UE receives at least a transport block and/or a PDCCH indicating downlink SPS release and the downlink carriers on which the UE does not receive data but detects at least one data has been missed, and M is the number of downlink sub-frames for which the UE needs to feed back ACK/NACK information in the current uplink sub-frame; or to determine the parameter value of the number of ACK/NACK bits, $n_{HARQ}$, as K when the UE adopts a spatial bundling scheme and a bundling scheme with an indicator of the number of data packets correctly received by the UE, wherein K the number of information bits for indicating the number of data packets correctly received by the UE.

19. The UE according to claim 15, wherein the parameter determining unit is further configured:
to determine the parameter value of the number of ACK/NACK bits, $n_{HARQ}$, according to the following data upon determining not to bundle the generated ACK/NACK information: the transport blocks received by the UE and PDCCHs indicating downlink SPS release received by the UE; or
to determine the parameter value of the number of ACK/NACK bits, $n_{HARQ}$, according to the following data upon determining not to bundle the generated ACK/NACK information: the transport blocks received by the UE and the PDCCHs indicating downlink SPS release received by the UE, and missed transport blocks/PDSCHs detected by the UE, and the missed PDCCHs indicating downlink SPS release detected by the UE.

20. The UE according to claim 19, wherein when the parameter determining unit is further configured to determine the parameter value of the number of ACK/NACKbits, $n_{HARQ}$, according to the following data upon determining not to bundle the generated ACK/NACK information: the transport blocks received by the UE and the PDCCHs indicating downlink SPS release received by the UE, the parameter determining unit is further configured:
to determine the parameter value of the number of ACK/NACK bits, $n_{HARQ}$, as S, wherein S is the total number of transport blocks received by the UE and the PDCCHs indicating downlink SPS release received by the UE; or
wherein when the parameter determining unit is further configured to determine the parameter value of the number of ACK/NACK bits, $n_{HARQ}$, according to the following data upon determining not to bundle the generated ACK/NACK information: the transport blocks received by the UE and the PDCCHs indicating downlink SPS release received by the UE, and the missed transport blocks/PDSCHs detected by the UE, and the missed PDCCHs indicating downlink SPS release detected by the UE, the parameter determining unit is further configured:
to determine the parameter value of the number of ACK/NACK bits, $n_{HARQ}$, as S+P, wherein S is the total number of transport blocks received by the UE and the PDCCHs indicating downlink SPS release received by the UE, and P is the total number of missed transport blocks/PDSCHs detected by the UE and the missed PDCCHs indicating downlink SPS release detected by the UE.

21. The UE according to claim 15, wherein the data transmitting unit is configured to determine the transmit power of the PUCCH in an uplink sub-frame i using the following formula of:

$$P_{PUCCH}(i)=\min(P_{CMAX,c}(i),P_{0\_PUCCH}+PL_c+h(n_{CQI},n_{HARQ},n_{SR})+\Delta_{F\_PUCCH}(F)+\Delta_{TxD}(F')+g(i));$$

wherein $P_{CMAX,c}(i)$ is higher layer-configured maximum transmit power of the UE;

$\Delta_{F\_PUCCH}$ is a higher layer-configured power offset value of a different PUCCH format from the PUCCH format 1a;

$h(n_{CQI},n_{HARQ},n_{SR})$ is a power offset value corresponding to the number of bits carried on the PUCCH, wherein $n_{CQI}$ is a parameter value of the number of bits of Channel State Information, CSI, $n_{HARQ}$ is the parameter value of the number of ACK/NACK bits, and $n_{SR}$ is a parameter value of the number of bits of a Scheduling Request, SR;

$P_{0\_PUCCH}$ is a target value of the transmit power of the PUCCH;

g(i) is an accumulative amount of the power control commands;

$PL_c$ is the value of a path loss measured by the UE; and $\Delta_{TxD}(F')$ is a higher layer-configured value of transmit power adjustment for the transmit diversity scheme of the UE.

\* \* \* \* \*